(12) United States Patent
Chisci et al.

(10) Patent No.: US 12,477,366 B2
(45) Date of Patent: Nov. 18, 2025

(54) TECHNIQUES FOR INTERFERENCE MEASUREMENT REPORTING FOR RECEIVER-ASSISTED CHANNEL ACCESS

(71) Applicant: QUALCOMM Incorporated, San Diego, CA (US)

(72) Inventors: Giovanni Chisci, San Diego, CA (US); Jing Sun, San Diego, CA (US); Arumugam Chendamarai Kannan, San Diego, CA (US); Vinay Chande, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 17/671,415

(22) Filed: Feb. 14, 2022

(65) Prior Publication Data
US 2022/0322124 A1    Oct. 6, 2022

Related U.S. Application Data

(60) Provisional application No. 63/171,064, filed on Apr. 5, 2021.

(51) Int. Cl.
*H04W 24/10* (2009.01)
*H04L 5/00* (2006.01)
*H04W 74/0808* (2024.01)

(52) U.S. Cl.
CPC ........... *H04W 24/10* (2013.01); *H04L 5/0048* (2013.01); *H04W 74/0808* (2013.01)

(58) Field of Classification Search
CPC .. H04W 24/10; H04W 74/0808; H04L 5/0048
See application file for complete search history.

(56) References Cited

U.S. PATENT DOCUMENTS

| | | | |
|---|---|---|---|
| 9,622,087 B2 * | 4/2017 | Li | H04W 72/0453 |
| 11,088,751 B2 * | 8/2021 | Davydov | H04B 7/0695 |

(Continued)

FOREIGN PATENT DOCUMENTS

EP    3720168 A1 * 10/2020 ............ H04W 16/14

*Primary Examiner* — Parth Patel
(74) *Attorney, Agent, or Firm* — Dalei Dong; Holland & Hart LLP

(57) ABSTRACT

Methods, systems, and devices for wireless communications are described for receiver-assisted channel access in shared radio frequency spectrum. A receiver, such as a user equipment (UE) may transmit a measurement report to a transmitter, such as an access network entity, that indicates channel occupancy as measured at the receiver. In some cases, the receiver may identify resources for signal measurement and reporting that are configured by the transmitter, and provide an interference measurement report based on the signal measurements. The interference measurement report may indicate whether a channel is occupied, or an occupancy level of the channel. Resources may be configured for multiple beams, with the interference measurement report including interference measurements for the multiple beams. Further, the signal resources may provide resources for a listen-before-talk (LBT) procedure, through signal resource sets that span multiple slots.

30 Claims, 20 Drawing Sheets

(56) References Cited

U.S. PATENT DOCUMENTS

| | | | |
|---|---|---|---|
| 11,228,382 B2* | 1/2022 | Siomina | H04B 17/318 |
| 11,362,716 B2* | 6/2022 | Manolakos | H04L 5/0082 |
| 11,696,284 B2* | 7/2023 | Liu | H04L 1/1893 |
| | | | 370/329 |
| 11,864,230 B2* | 1/2024 | Yang | H04W 74/0808 |
| 2012/0294138 A1* | 11/2012 | Okamoto | H04L 27/2691 |
| | | | 370/210 |
| 2013/0188571 A1* | 7/2013 | Cheong | H04W 28/04 |
| | | | 370/329 |
| 2014/0133365 A1* | 5/2014 | Peng | H04L 5/14 |
| | | | 370/278 |
| 2016/0227427 A1* | 8/2016 | Vajapeyam | H04L 5/0048 |
| 2016/0242105 A1* | 8/2016 | Schier | H04W 48/12 |
| 2016/0278118 A1* | 9/2016 | Yerramalli | H04L 5/0094 |
| 2018/0035438 A1* | 2/2018 | Pao | H04W 72/21 |
| 2018/0124622 A1* | 5/2018 | Van Der Velde | H04B 17/345 |
| 2018/0352573 A1* | 12/2018 | Yang | H04W 16/14 |
| 2018/0359790 A1* | 12/2018 | Ingale | H04W 72/51 |
| 2019/0334577 A1* | 10/2019 | Damnjanovic | H04L 27/2602 |
| 2020/0029238 A1* | 1/2020 | Si | H04L 5/0053 |
| 2020/0052803 A1* | 2/2020 | Deenoo | H04W 48/12 |
| 2020/0260450 A1* | 8/2020 | Ji | H04L 5/0091 |
| 2020/0275430 A1* | 8/2020 | Salem | H04L 1/1614 |
| 2020/0359404 A1* | 11/2020 | Nilsson | H04B 7/088 |
| 2021/0314931 A1* | 10/2021 | Farag | H04W 72/046 |
| 2022/0124796 A1* | 4/2022 | Salem | H04L 5/0051 |
| 2022/0124806 A1* | 4/2022 | Hu | H04W 16/28 |
| 2022/0304056 A1* | 9/2022 | Harada | H04L 5/0094 |
| 2022/0322124 A1* | 10/2022 | Chisci | H04W 24/10 |
| 2022/0377790 A1* | 11/2022 | Awadin | H04W 74/006 |
| 2023/0007522 A1* | 1/2023 | Yang | H04W 24/10 |
| 2023/0041484 A1* | 2/2023 | Liu | H04W 74/0816 |
| 2023/0100009 A1* | 3/2023 | Niu | H04B 7/0617 |
| | | | 370/252 |
| 2023/0110740 A1* | 4/2023 | Yao | H04L 5/0048 |
| | | | 370/318 |
| 2023/0148159 A1* | 5/2023 | Zhang | H04L 5/0051 |
| | | | 370/329 |
| 2023/0171623 A1* | 6/2023 | Zeineddine | H04L 5/0035 |
| | | | 370/252 |
| 2023/0189020 A1* | 6/2023 | Calcev | H04W 74/006 |
| | | | 370/329 |
| 2023/0246697 A1* | 8/2023 | Yuk | H04B 7/0691 |
| | | | 375/267 |
| 2023/0354419 A1* | 11/2023 | Yang | H04B 7/0617 |
| 2023/0361894 A1* | 11/2023 | Bhamri | H04W 24/10 |
| 2023/0403058 A1* | 12/2023 | Khan Beigi | H04W 74/0816 |
| 2023/0421273 A1* | 12/2023 | Fan | H04B 17/309 |
| 2024/0031044 A1* | 1/2024 | Kim | H04L 5/0048 |
| 2024/0057156 A1* | 2/2024 | Ali | H04W 74/006 |
| 2024/0073940 A1* | 2/2024 | Chen | H04W 74/002 |
| 2024/0154664 A1* | 5/2024 | Bhamri | H04L 5/0053 |
| 2024/0187080 A1* | 6/2024 | Ghanbarinejad | H04B 7/088 |

\* cited by examiner

TECHNIQUES FOR INTERFERENCE MEASUREMENT REPORTING FOR RECEIVER-ASSISTED CHANNEL ACCESS

CROSS REFERENCE

The present Application for Patent claims the benefit of U.S. Provisional Patent Application No. 63/171,064 by CHISCI et al., entitled "TECHNIQUES FOR INTERFERENCE MEASUREMENT REPORTING FOR RECEIVER-ASSISTED CHANNEL ACCESS," filed Apr. 5, 2021, assigned to the assignee hereof, and expressly incorporated by reference herein.

FIELD OF TECHNOLOGY

The following relates to wireless communications, including techniques for interference measurement reporting for receiver-assisted channel access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, shared radio frequency spectrum may be used for wireless communications. In such systems, multiple different transmitting devices may contend for access to a wireless channel using a contention-based access procedure such as a listen-before-talk (LBT) procedure (e.g., a clear channel assessment (CCA)). Efficient techniques for performing LBT procedures to reliably detect channel occupancy in shared radio frequency spectrum may help to enhance the reliability and efficiency of wireless communications systems.

SUMMARY

The described techniques relate to improved methods, systems, devices, and apparatuses that support techniques for interference measurement reporting for receiver-assisted channel access. Various described techniques provide for a receiver (e.g., a user equipment (UE)) to transmit a measurement report that indicates channel occupancy as measured at the receiver. The transmitting device (e.g., an access network entity) may use the measurement report to determine that the channel is available, and initiate communications with the receiver. In some cases, the receiving device may identify resources for signal measurement and reporting (e.g., reference signal resources), and provide an interference measurement report based on the signal measurements. In some cases, the interference measurement report may indicate whether a channel is occupied, or an occupancy level of the channel. Resources may be configured for multiple beams, with the interference measurement report including interference measurements for the multiple beams. Further, in some cases, the resources may provide sufficient resources for a listen-before-talk (LBT) procedure, through reference signal resource sets that span multiple slots.

A method for wireless communication at a user equipment (UE) is described. The method may include receiving, from an access network entity, an indication to provide an interference measurement report based on one or more signals transmitted by the access network entity, receiving the one or more signals transmitted by the access network entity, and transmitting, to the access network entity, the interference measurement report based at least in part on one or more interference levels of the one or more received signals, wherein the one or more interference levels indicate channel occupation of an associated channel bandwidth of the one or more signals.

An apparatus for wireless communication at a UE is described. The apparatus may include a processor, memory coupled with the processor, and instructions stored in the memory. The instructions may be executable by the processor to cause the apparatus to receive, from an access network entity, an indication to provide an interference measurement report based on one or more signals transmitted by the access network entity, receive the one or more signals transmitted by the access network entity, and transmit, to the access network entity, the interference measurement report based at least in part on one or more interference levels of the one or more received signals, wherein the one or more interference levels indicate channel occupation of an associated channel bandwidth of the one or more signals.

Another apparatus for wireless communication at a UE is described. The apparatus may include means for receiving, from an access network entity, an indication to provide an interference measurement report based on one or more signals transmitted by the access network entity, means for receiving the one or more signals transmitted by the access network entity, and means for transmitting, to the access network entity, the interference measurement report based at least in part on one or more interference levels of the one or more received signals, wherein the one or more interference levels indicate channel occupation of an associated channel bandwidth of the one or more signals.

A non-transitory computer-readable medium storing code for wireless communication at a UE is described. The code may include instructions executable by a processor to receive, from an access network entity, an indication to provide an interference measurement report based on one or more signals transmitted by the access network entity, receive the one or more signals transmitted by the access network entity, and transmit, to the access network entity, the interference measurement report based at least in part on one or more interference levels of the one or more received signals, wherein the one or more interference levels indicate channel occupation of an associated channel bandwidth of the one or more signals.

In some examples of the method, apparatuses, and non-transitory computer-readable medium described herein, the one or more interference levels provide a wideband interference measurement across a channel bandwidth of a communications channel between the UE and the access network entity. In some examples of the method, apparatuses, and non-transitory computer-readable medium described herein, the wideband interference measurement across the channel bandwidth of the communications channel indicates channel occupation for a receiver-assisted channel access procedure.

In some examples of the method, apparatuses, and non-transitory computer-readable medium described herein, the identifying may include operations, features, means, or instructions for measuring a received signal strength of each of a set of multiple resource elements of the one or more signals and summing the received signal strength measurements to generate a received signal strength indicator (RSSI) that is provided in the interference measurement report.

In some examples of the method, apparatuses, and non-transitory computer-readable medium described herein, the measuring may include operations, features, means, or instructions for measuring the one or more signals for a set of multiple beams based on a set of multiple transmission configuration indicator (TCI) states that are provided in a configuration for the interference measurement report. In some examples of the method, apparatuses, and non-transitory computer-readable medium described herein, the interference measurement report provides layer one (L1) RSSI measurements over one or more reference signals. In some examples of the method, apparatuses, and non-transitory computer-readable medium described herein, the transmitting the interference measurement report may include operations, features, means, or instructions for reporting a set of multiple measurements for a set of multiple beams, where each beam of the set of multiple beams is associated with a configured resource of a reference signal resource set.

Some examples of the method, apparatuses, and non-transitory computer-readable medium described herein may further include operations, features, means, or instructions for comparing the one or more measured interference levels associated with a first signal of the one or more signals to one or more threshold values and setting a channel occupation status of the associated channel bandwidth based on the comparing, and where the channel occupation status is provided with the interference measurement report. In some examples of the method, apparatuses, and non-transitory computer-readable medium described herein, the channel occupation status may be a multi-level occupation status that is determined based on multiple threshold values that are compared to the one or more measured interference levels associated with the first signal. In some examples of the method, apparatuses, and non-transitory computer-readable medium described herein, the multiple threshold values may be configured by radio resource control (RRC) signaling, in an activation downlink control information (DCI), or any combinations thereof.

Some examples of the method, apparatuses, and non-transitory computer-readable medium described herein may further include operations, features, means, or instructions for receiving, from the access network entity, a measurement report configuration that indicates resources for the one or more signals. In some examples of the method, apparatuses, and non-transitory computer-readable medium described herein, the resources for the one or more signals include channel state information reference signal (CSI-RS) resources for interference measurement (CSI-IM) or non-zero-power CSI-IM. In some examples of the method, apparatuses, and non-transitory computer-readable medium described herein, the measurement report configuration further indicates beam information for one or more beams associated with one or more reference signals. In some examples of the method, apparatuses, and non-transitory computer-readable medium described herein, the beam information may be included in the measurement report configuration in a beam indication field for one or more types of reference signals. In some examples of the method, apparatuses, and non-transitory computer-readable medium described herein, the beam information may be derived based on a reference signal spatial quasi-colocation (QCL), or QCL Type D, for one or more interference measurement resources. In some examples of the method, apparatuses, and non-transitory computer-readable medium described herein, the beam information is provided in one or more explicit QCL information fields, or is derived from a beam associated with one or more synchronization signals, reference signals, beam selection signals, or control signals.

In some examples of the method, apparatuses, and non-transitory computer-readable medium described herein, the one or more signals may be each transmitted in a set of multiple resource elements that span the associated channel bandwidth of the associated signal. In some examples of the method, apparatuses, and non-transitory computer-readable medium described herein, the one or more signals provide for time domain multiplexed interference measurements prior to performing a fast Fourier transform (FFT) on signal resources.

In some examples of the method, apparatuses, and non-transitory computer-readable medium described herein, the one or more signals span time resources associated with a listen-before-talk (LBT) procedure associated with the receiver-assisted channel access procedure. In some examples of the method, apparatuses, and non-transitory computer-readable medium described herein, each signal of the one or more signals may be configured with a number of repetitions at symbol-level granularity and an offset relative to a starting symbol to provide resources that span the time resources associated with the LBT procedure. In some examples of the method, apparatuses, and non-transitory computer-readable medium described herein, each signal of the one or more signals may be configured in set of multiple resource sets associated with a set of multiple symbols that span the time resources associated with the LBT procedure.

A method for wireless communication at an access network entity is described. The method may include transmitting an indication to provide an interference measurement report based on one or more signals transmitted by the access network entity, transmitting the one or more signals in a set of signal resources that span a channel bandwidth of a communications channel between a UE and the access network entity, and receiving, from the UE, the interference measurement report that indicates, for the one or more signals, measured interference levels at the UE.

An apparatus for wireless communication at an access network entity is described. The apparatus may include a processor, memory coupled with the processor, and instructions stored in the memory. The instructions may be executable by the processor to cause the apparatus to transmit an indication to provide an interference measurement report based on one or more signals transmitted by the access network entity, transmit the one or more signals in a set of signal resources that span a channel bandwidth of a communications channel between a UE and the access network entity, and receive, from the UE, the interference measurement report that indicates, for the one or more signals, measured interference levels at the UE.

Another apparatus for wireless communication at an access network entity is described. The apparatus may include means for transmitting an indication to provide an interference measurement report based on one or more signals transmitted by the access network entity, means for transmitting the one or more signals in a set of signal resources that span a channel bandwidth of a communications channel between a UE and the access network entity, and means for receiving, from the UE, the interference measurement report that indicates, for the one or more signals, measured interference levels at the UE.

A non-transitory computer-readable medium storing code for wireless communication at an access network entity is described. The code may include instructions executable by a processor to transmit an indication to provide an interference measurement report based on one or more signals transmitted by the access network entity, transmit the one or more signals in a set of signal resources that span a channel bandwidth of a communications channel between a UE and the access network entity, and receive, from the UE, the interference measurement report that indicates, for the one or more signals, measured interference levels at the UE.

In some examples of the method, apparatuses, and non-transitory computer-readable medium described herein, the measured interference levels provide a wideband interference measurement across a channel bandwidth of the communications channel between the UE and the access network entity. In some examples of the method, apparatuses, and non-transitory computer-readable medium described herein, the wideband interference measurement across the channel bandwidth of the communications channel indicates channel occupation for a receiver-assisted channel access procedure. In some examples of the method, apparatuses, and non-transitory computer-readable medium described herein, the interference measurement report indicates a received signal strength indicator (RSSI) for the one or more signals for the associated channel bandwidth.

Some examples of the method, apparatuses, and non-transitory computer-readable medium described herein may further include operations, features, means, or instructions for configuring the UE with a set of multiple transmission configuration indicator (TCI) states for a set of multiple beams, and where the indication to provide the interference measurement report indicates one or more of the TCI states. In some examples of the method, apparatuses, and non-transitory computer-readable medium described herein, the interference measurement report provides layer one (L1) RSSI measurements over the one or more signals. In some examples of the method, apparatuses, and non-transitory computer-readable medium described herein, the receiving the interference measurement report may include operations, features, means, or instructions for receiving a set of multiple measurements for a set of multiple beams, and where each beam of the set of multiple beams is associated with a configured resource of a signal resource set.

Some examples of the method, apparatuses, and non-transitory computer-readable medium described herein may further include operations, features, means, or instructions for determining a channel occupation status of the channel bandwidth based on the measured interference levels provided in the interference measurement report. In some examples of the method, apparatuses, and non-transitory computer-readable medium described herein, the channel occupation status may be a multi-level occupation status that is indicated by the interference measurement report based on multiple threshold values that are compared to the measured interference levels. In some examples of the method, apparatuses, and non-transitory computer-readable medium described herein, the multiple threshold values may be configured by RRC signaling, in an activation DCI, or any combinations thereof.

Some examples of the method, apparatuses, and non-transitory computer-readable medium described herein may further include operations, features, means, or instructions for transmitting a measurement report configuration that indicates resources for the one or more signals. In some examples of the method, apparatuses, and non-transitory computer-readable medium described herein, the resources for the one or more signals include channel state information reference signal (CSI-RS) resources for interference measurement (CSI-IM) or non-zero-power CSI-IM.

In some examples of the method, apparatuses, and non-transitory computer-readable medium described herein, the measurement report configuration further indicates beam information for one or more beams associated with one or more signals. In some examples of the method, apparatuses, and non-transitory computer-readable medium described herein, the beam information may be included in the measurement report configuration in a beam indication field for one or more types of signals. In some examples of the method, apparatuses, and non-transitory computer-readable medium described herein, the beam information may be derived based on a signal spatial QCL, or QCL Type D, for one or more interference measurement resources.

In some examples of the method, apparatuses, and non-transitory computer-readable medium described herein, the one or more signals may be each transmitted in a set of multiple resource elements that span the channel bandwidth of the associated signal. In some examples of the method, apparatuses, and non-transitory computer-readable medium described herein, the one or more signals provide for time domain multiplexed interference measurements prior to performing a fast FFT on signal resources.

In some examples of the method, apparatuses, and non-transitory computer-readable medium described herein, the one or more signals span time resources associated with an LBT procedure associated with the receiver-assisted channel access procedure. In some examples of the method, apparatuses, and non-transitory computer-readable medium described herein, each signal of the one or more signals may be configured with a number of repetitions at symbol-level granularity and an offset relative to a starting symbol to provide resources that span the time resources associated with the LBT procedure. In some examples of the method, apparatuses, and non-transitory computer-readable medium described herein, each signal of the one or more signals may be configured in set of multiple resource sets associated with a set of multiple symbols that span the time resources associated with the LBT procedure.

DETAILED DESCRIPTION

Figure 1:
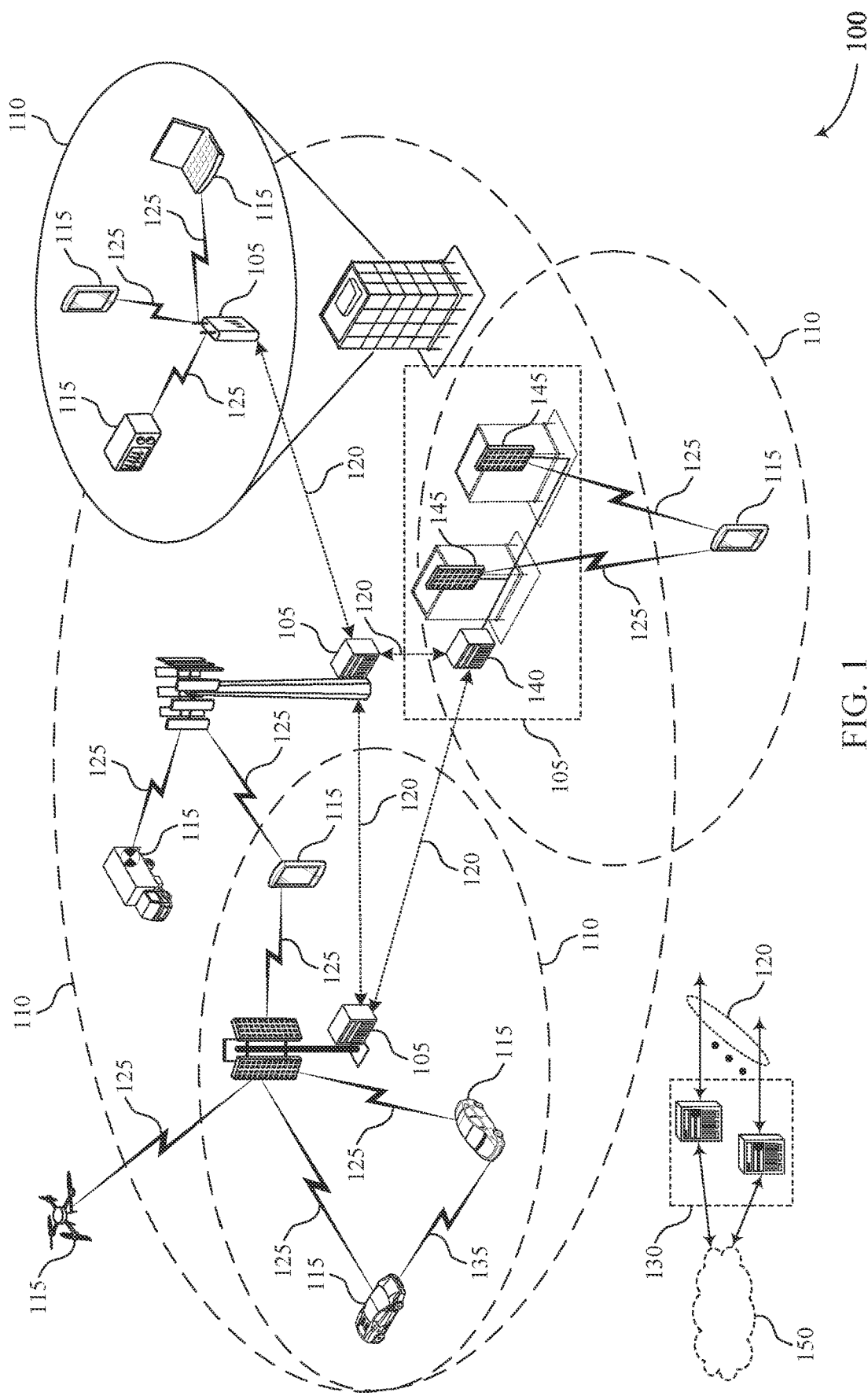
FIG. 1 illustrates an example of a wireless communications system that supports techniques for interference measurement reporting for receiver-assisted channel access in accordance with aspects of the present disclosure.

In various aspects of the present disclosure, shared radio frequency spectrum may be used for wireless communications, and contention-based access procedures may be used to determine availability of a channel for communications. In some cases, receiver-assisted channel access procedures may be used in which a receiver may measure channel interference as part of a channel access procedure. In some cases, a transmitting device (e.g., an access network entity or a base station) may initiate a listen-before-talk (LBT) procedure (e.g., a clear channel assessment (CCA)), and a receiving device (e.g., a user equipment (UE), which may sometimes be referred to as a class A receiver) may provide an interference measurement report that indicates a channel occupancy as measured at the receiving device.

In some cases, the shared radio frequency spectrum may use a relatively high frequency bandwidth that uses directional beamforming. For example, the shared radio frequency spectrum may use a 60 GHz frequency band (e.g., which may be referred to as Fr2x), in which relatively narrow beamforming operations may be used to provide a reliable link between devices. In such frequencies, a base station may not be able to detect other transmitters that are in close proximity to a receiving UE when performing a LBT procedure. Thus, if the base station does not sense that the channel is occupied in the LBT procedure, it does not mean that the receiving UE can reliably receive signals. By providing receiver-assisted channel access, the receiving UE may provide an indication of channel occupancy to the base station for determination channel availability.

In some cases, a base station may configure signal resources (e.g., reference signal resources) that may be used for interference measurement at a UE. An interference measurement report may be provided by the UE based on measurements of the configured signal resources that indicates whether a channel is occupied, or an occupancy level of the channel in cases where some interference may be tolerable. The signal resources may be configured for multiple beams, with the interference measurement report including interference measurements for the multiple beams. Additionally, the signal resources may be configured to provide resources for an LBT procedure, through modifications to resource sets configured for CSI-RS to provide resources that span multiple slots.

In some cases, existing channel state information reference signal (CSI-RS) framework may be modified to configure reference signals, reference signal resources, and reporting resources for receiver-assisted channel access. For example, CSI-RS resources may be modified to provide for channel measurement (e.g., received signal strength indicator (RSSI) measurement) across a channel bandwidth. In such cases, a reference signal pattern may be provided that has resource elements (REs) for reference signals that span the entire channel bandwidth, rather than a subset of REs within a channel bandwidth (e.g., existing CSI-RS resources that occupy two or four sub-carriers). Further, by providing reference signal resources that span a channel bandwidth, the UE may perform interference measurements across the channel bandwidth without having to perform a FFT (e.g., due to the reference signal REs spanning the entire bandwidth), which allows for fast RSSI measurement with reduced processing overhead.

Aspects of the disclosure are initially described in the context of wireless communications systems. Aspects of the disclosure are further illustrated by and described with reference to reference signal resources, process flows, apparatus diagrams, system diagrams, and flowcharts that relate to techniques for interference measurement reporting for receiver-assisted channel access.

FIG. 1 illustrates an example of a wireless communications system 100 that supports techniques for interference measurement reporting for receiver-assisted channel access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 15 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, communications may use shared radio frequency spectrum, and a UE 115 may provide receiver-assisted channel access in a contention-based channel access procedure. In some cases, a UE 115 may transmit an interference measurement report that indicates channel occupancy as measured at the UE 115. A base station 105 may use the interference measurement report to determine that the channel is available, and initiate communications with the UE 115. In some cases, the UE 115 may identify resources for signal measurement and reporting, and provide an interference measurement report based on the signal measurements. In some cases, the interference measurement report may indicate whether a channel is occupied, or an occupancy level of the channel. Signal resources may be configured for multiple beams, with the interference measurement report including interference measurements for the multiple beams. Further, in some cases, the signal resources provide resources for a LBT procedure, through signal resource sets that span multiple slots.

Figure 2:
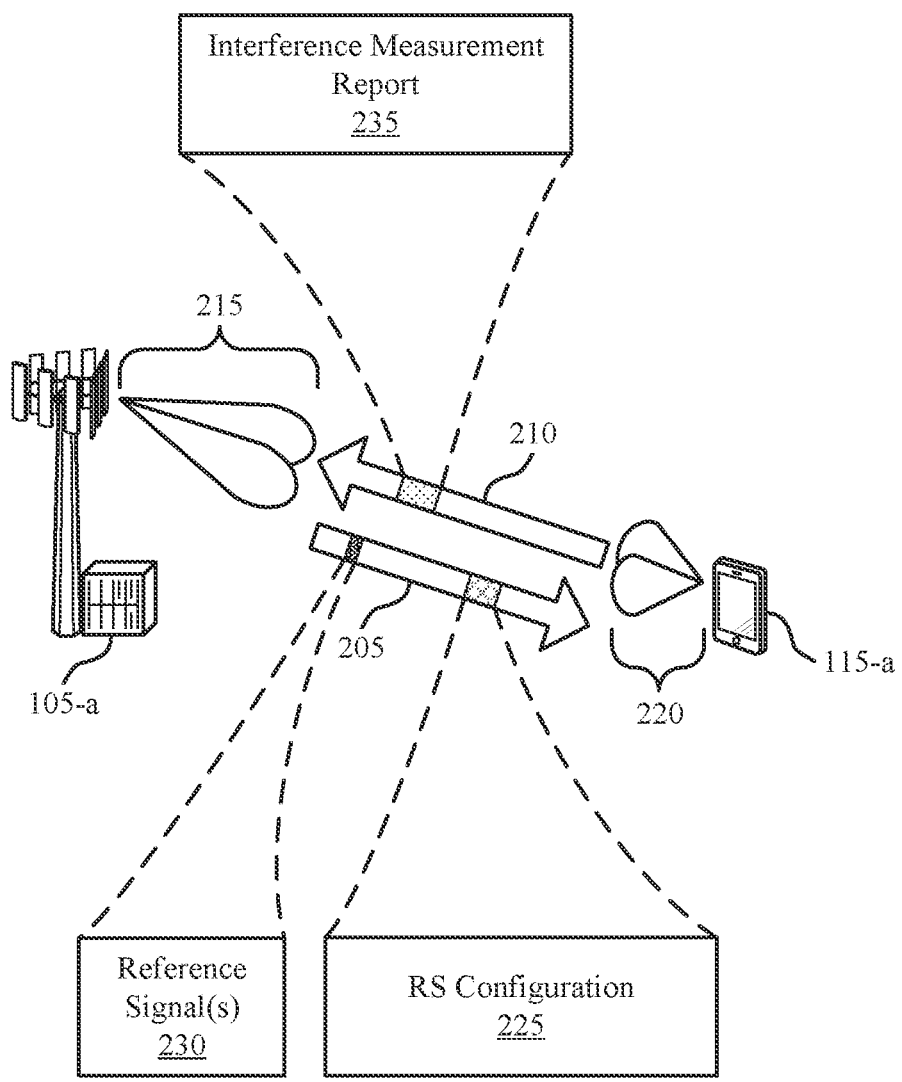
FIG. 2 illustrates an example of a portion of a wireless communications system that supports techniques for interference measurement reporting for receiver-assisted channel access in accordance with aspects of the present disclosure.

FIG. 2 illustrates an example of a wireless communications system 200 that supports techniques for interference measurement reporting for receiver-assisted channel access in accordance with aspects of the present disclosure. Wireless communications system 200 may include an access network entity such as a base station 105-a and a UE 115-a, which may be examples of corresponding base stations 105 and UEs 115 as described with reference to FIG. 1.

As described herein, base station 105-a and UE 115-a may communicate using a shared radio frequency spectrum band, either alone or in combination with communications on a licensed radio frequency spectrum band, and may use receiver-assisted channel access techniques to determine channel occupancy. In this example, base station 105-a may transmit downlink communications on downlink carrier 205, and the UE 115-a may transmit uplink communications on uplink carrier 210. In some cases, carriers 205 and 210 may be the same carrier. In some cases, carriers 205 and 210 may be component carriers (CCs), and a number of different CCs may be used for communications between the UE 115-a and the base station 105-a. In some cases, carriers 205 and 210 may use beamformed communications (e.g., using Fr2x frequencies) via base station beams 215 and UE beams 220.

In some cases, the base station 105-a may provide a reference signal configuration (e.g., a CSI-RS configuration) that provides reference signal resources that are to be measured at the UE 115-a in a channel access procedure (e.g., a contention-based channel access that may employ LBT procedures such as a CCA). In some cases, the reference signal resources may span a channel bandwidth of a particular communications channel that is to be used for communications between the UE 115-a and the base station 105-a. The UE 115-a, as part of the channel access procedure, may measure one or more reference signals 230 (e.g., using one or more beams), and may transmit an interference measurement report 235 to the base station 105-a. In some cases, the interference measurement report 235 may include channel occupancy information that is measured at the UE 115-a, that the base station 105-a may use in conjunction with its own channel occupancy measurements (e.g., as part of a LBT procedure) to determine if the channel is available for communications with the UE 115-a. In the event that the channel is available, the base station 105-a may provide a resource allocation to the UE 115-a and uplink and downlink communications may use allocated resources. In the event that the channel is unavailable, the base station 105-a may start a backoff counter and re-initiate the channel access procedure after the backoff counter expires.

In some cases, the interference measurement report 235 may provide channel occupancy information for one or more measured symbols that the base station 105-a may use to confirm that the channel is available in conjunction with a LBT procedure performed at the base station 105-a. In other cases, the interference measurement report 235 may be provided even in cases where LBT is not mandated, in order to check the short-term occupation status of a directional channel at the UE 115-a before scheduling transmissions (e.g., per-beam energy/interference level, such as a per-beam RSSI, may confirm channel occupancy status). In some cases, one or more RSSI measurements may provide a total received power from all sources including interference and noise, measured across a set of resource blocks (RBs), during symbols containing CSI-RS resource elements, and the RSSI may provide a reliable indicator for the occupation of a channel. In some cases, as discussed in more detail with reference to FIG. 3, reference signal resources may be provided for interference measurement that span entire RBs that are to be measured, and the interference measurement report 235 may provide a layer-1 (L1) RSSI for a channel. In some cases, the L1 RSSI measurement(s) may provide channel occupation information, and RSSI measurements may be tested against one or more threshold values to determine channel occupancy, or a level of channel occupancy.

In some cases, the interference measurement report 235 may be provided by the UE 115-a based on a trigger event. For example, the base station 105-a may transmit a CSI-Request field in a downlink control information (DCI) transmission that provides an uplink grant for an aperiodic CSI report over physical uplink shared channel (PUSCH). The measurements for the interference measurement report 235 may include an interference level (e.g., RSSI) on some CSI-RSs. In such cases, the base station 105-a may make sure there is not downlink or uplink transmission on resource elements (REs) for the measured CSI-RSs through scheduling procedures. The interference measurement(s) in the interference measurement report 235 may indicate a sum of received power over the REs of the CSI-RSs, so the measurement timeline can be faster than a traditional CSI reporting (e.g., faster than existing timelines for CSI reporting, using an interference measurement timeline that is faster than existing timelines). Additionally, in some cases multibeam measurements may be provided using transmission configuration indicator (TCI) indications in CSI report configurations.

In some cases, the reference signal configuration 225 may provide CSI interference management (CSI-IM) resources (e.g., CSI-IM with legacy pattern0/pattern1, or a new pattern2 for full RB look (all REs) as discussed with reference to FIG. 3), or non-zero-power (NZP) CSI-IM resources (e.g., to provide an interference level over one or more reference signals that have zero power). In some cases, the reported quantities may include an L1-RSSI over the configured CSI-RSs, an occupation status (e.g., occupied/free) obtained by testing the L1-RSSI with a threshold, or any combinations thereof. Further, in some cases, LBT-type of measurements may be performed, as discussed with reference to the examples of FIGS. 4 through 6. Additionally, multibeam reporting may be provided for per-beam reporting quantities.

In some examples, the interference measurement report 235 may provide measurements that are different than provided in a CSI report. For example, a CSI report may provide quantities for Channel Quality Indicator (CQI), precoding matrix indicator (PMI), CSI-RS resource indicator (CRI), SS/PBCH Block Resource indicator (SSBRI), layer indicator (L1), rank indicator (RI), and L1-RSRP or L1-SINR. In some examples, the interference measurement report 235 may provide one or more of the following reported quantities: L1-RSSI over the configured CSI-RSs: per beam reporting is according to the CRI framework (e.g., as for cri-RSRP); occupation status (e.g., occupied/free), obtained by testing the L1-RSSI with a threshold (e.g., one or more quantized RSSI thresholds); or any combinations thereof. In some cases, multi-level occupation status according to multiple thresholds can be reported. In some cases, the maximum number of layers of quantized RSSI may be configured by the base station 105-a (e.g., in Csi-Report-Config (RRC table)), signaled in DCI activation, or predetermined (e.g., hardcoded in a specification). In some cases, the threshold(s) for channel occupancy may be configured by the base station 105-a (e.g., in Csi-Report-Config (RRC table)), or signaled in DCI activation. In some cases, the interference measurement report 235 parameters may be indicated in configuration information that provides quantities or combinations of quantities as valid higher layer parameters, such as in a reportQuantity field in the UE CSI-ReportConfig (e.g., fields for cri-RSSI, cri-occupation, etc.).

In some aspects, beam level information may be provided with channel occupancy information. In existing CSI configurations, a CSI-Report-Config, may include a TCI-StateId for beam specific reference signal measurements that refers to resourcesForChannelMeasurement, specifically nzp-CSI-RS-IM. In such cases, the UE 115-a can assume that the CSI-IM to are resource-wise quasi-co-location (QCL). Further, the UE 115-a can consider the nzp-CSI-RS-IM also to be resource-wise QCL. In some cases, NZP-CSI-IM can be used as well to exploit the variety of patterns, and neither of those have explicit qcl-info in the RRC configured Csi-Report-Config. In accordance with some aspects, the base station 105-a may provide Csi-Report-Config for receiver-assistance, where the UE 115-a can compute interference by using CSI-IM resources for interference or NZP-CSI-IM resources for interference. In some cases, the Csi-Report-Config used for receiver-assistance channel access may provide beam indications for the resources for interference measurements. In some cases, the beam indications may be provided in one or more explicit qcl-info fields with tci-state-based beam indications for one or both of CSI-IM resources and NZP-CSI-IM resources. In other cases, the beam indications (e.g., qcl-info) may be derived resource-wise from NZP-CSI-RS resources for the channel.

Figure 3:
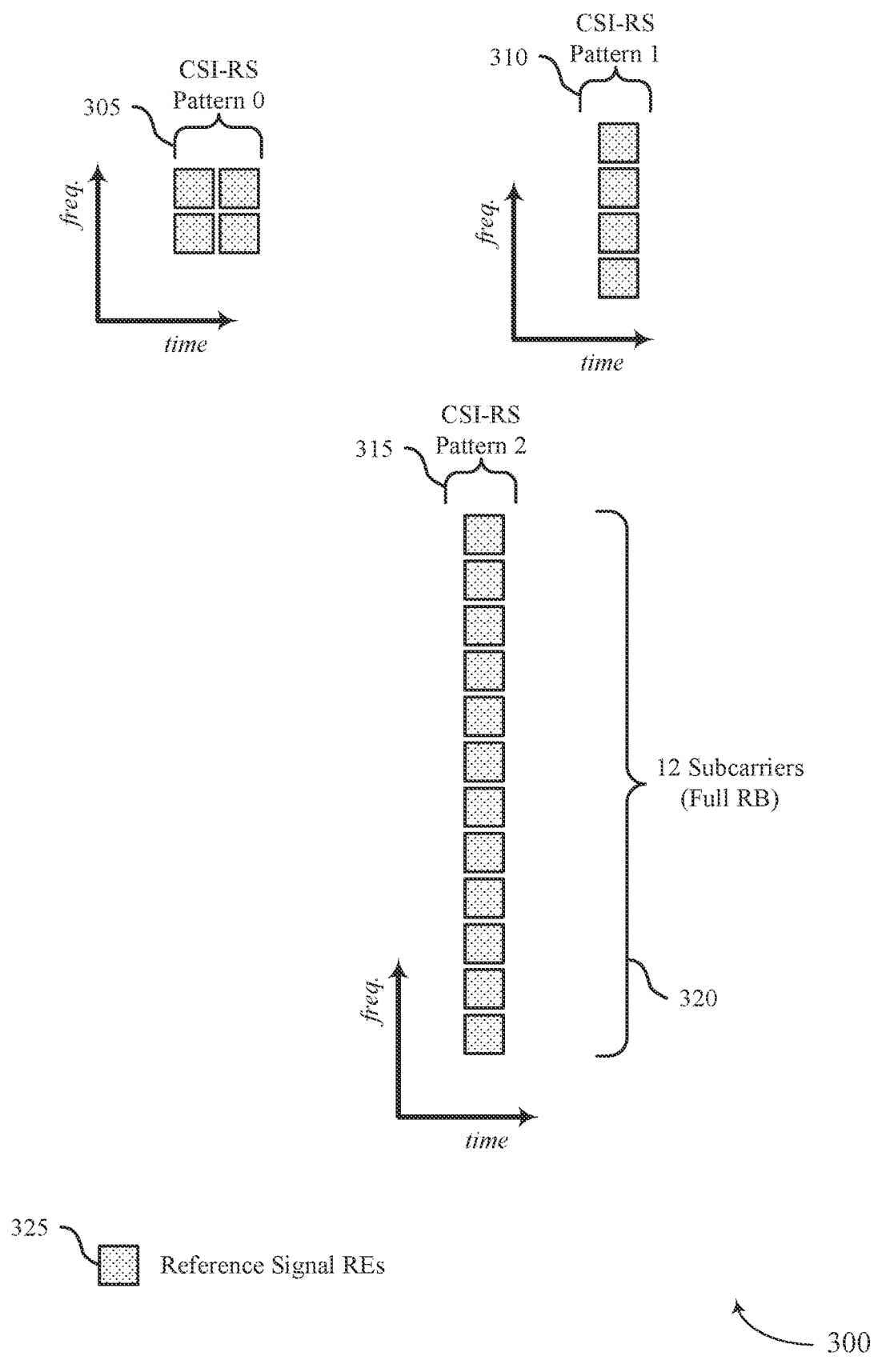
FIG. 3 illustrates an example of reference signal patterns that support techniques for interference measurement reporting for receiver-assisted channel access in accordance with aspects of the present disclosure.

FIG. 3 illustrates examples of reference signal patterns 300 that support techniques for interference measurement reporting for receiver-assisted channel access in accordance with aspects of the present disclosure. In some examples, reference signal patterns 300 may implement aspects of wireless communications system 100 or 200. In this example, one or more reference signal configurations may be provided to a UE (e.g., a UE 115 of FIG. 1 or 2) by a base station (e.g., a base station 105 of FIG. 1 or 2).

In a first example a CSI-RS resource pattern 305 may occupy four REs 325 that span two sub-carriers and two symbols. In some cases, the CSI-RS resource pattern 305 may correspond to CSI-RS resource pattern 0 that is used in some established CSI procedures. In a second example a CSI-RS resource pattern 310 may occupy four REs 325 that span four sub-carriers in one symbol. In some cases, the CSI-RS resource pattern 310 may correspond to CSI-RS resource pattern 1 that is used in some established CSI procedures.

Figure 4:
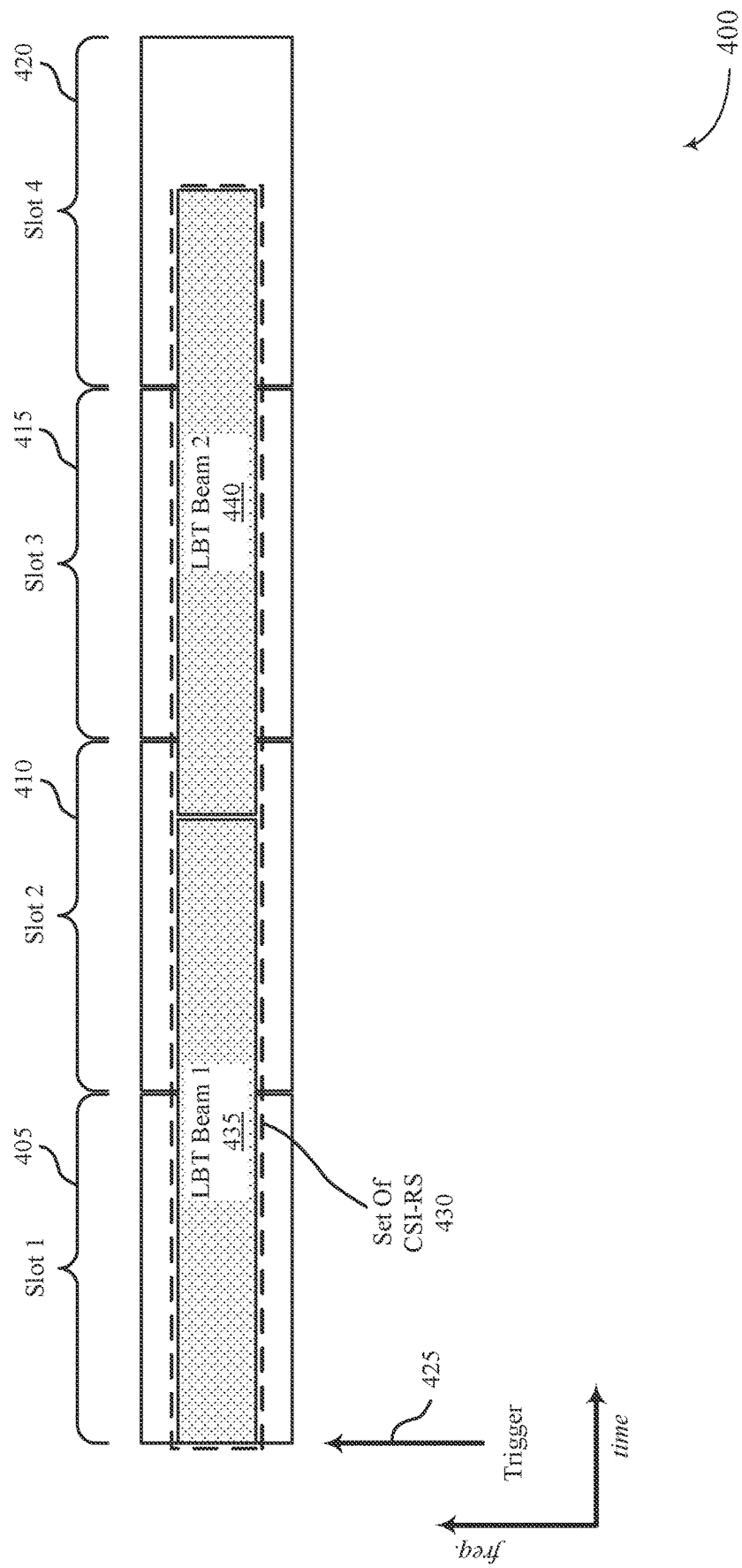
FIG. 4 illustrates an example of reference signal resources that support techniques for interference measurement reporting for receiver-assisted channel access in accordance with aspects of the present disclosure.
Figure 5:
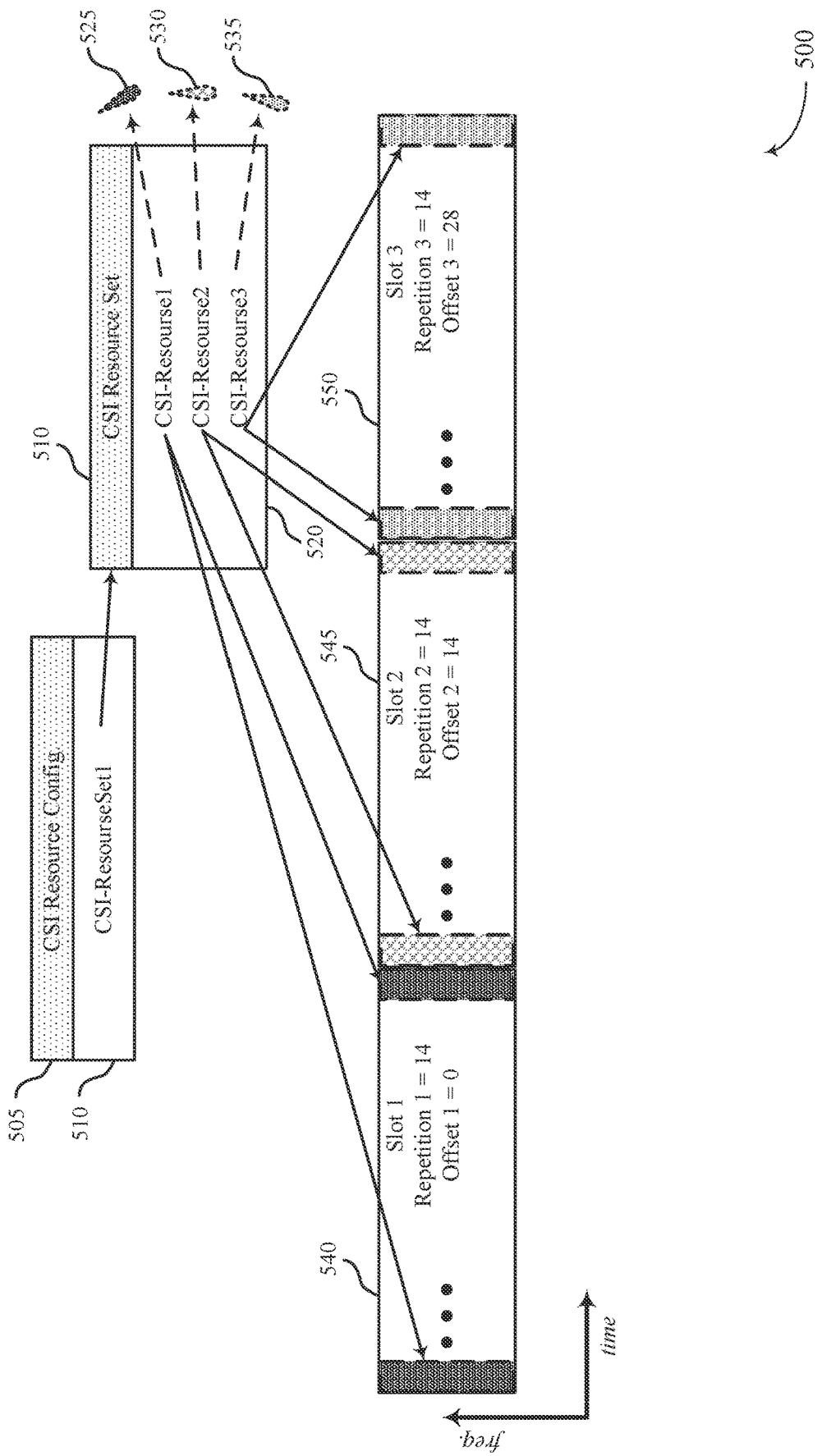
FIGS. 5 and 6 illustrate examples of a reference signal resource sets that support techniques for interference measurement reporting for receiver-assisted channel access in accordance with aspects of the present disclosure.
Figure 6:
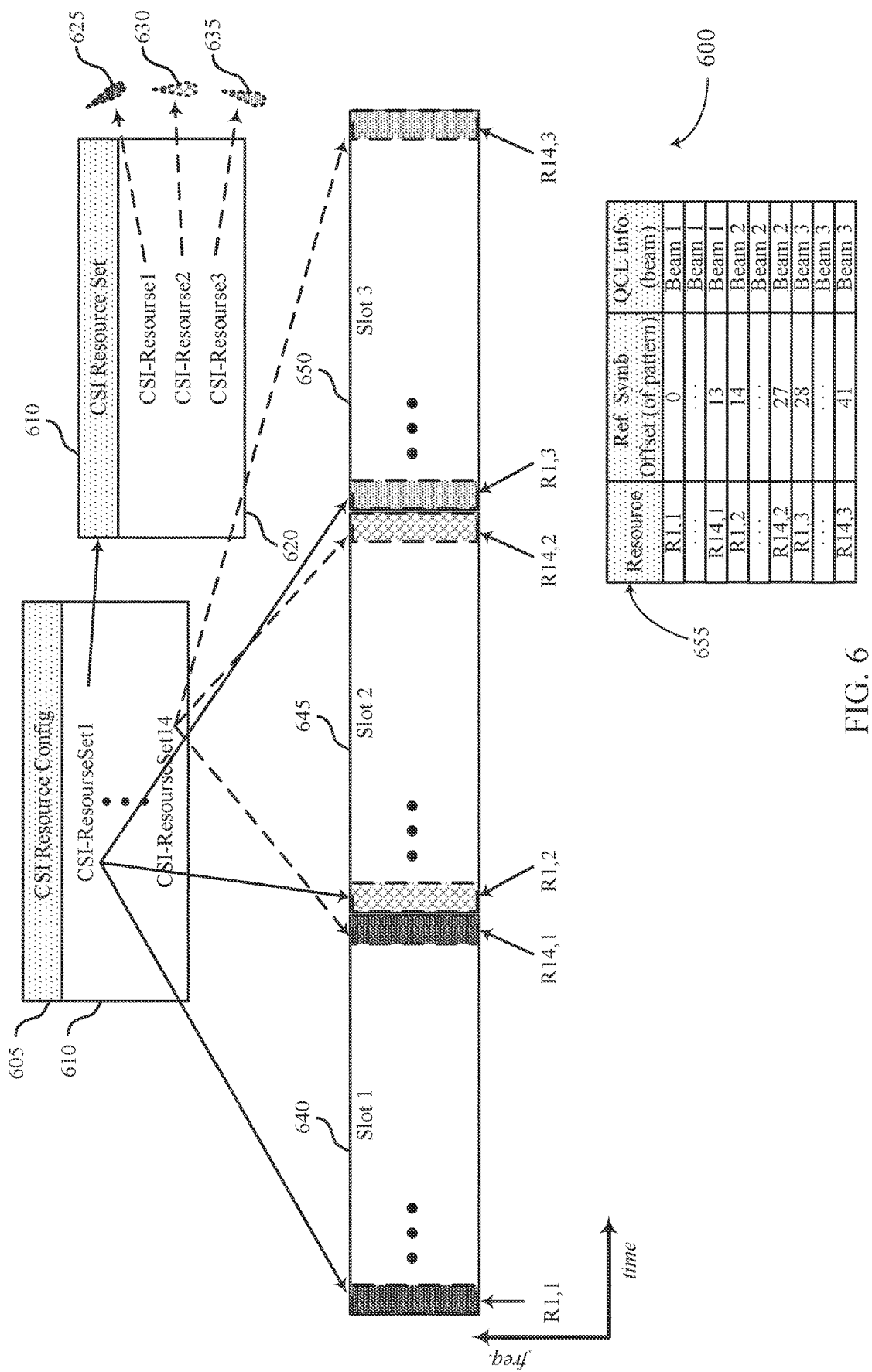

In accordance with some aspects discussed herein, an additional reference signal resource pattern may be provided as CSI-RS resource pattern 315. In some cases, the CSI-RS resource pattern 315 may be referred to as CSI-RS resource pattern 2. In some cases, the CSI-RS resource pattern 315 may occupy 12 REs 325 that span 12 subcarriers (e.g., all subcarriers of a RB) for one symbol. In some cases, CSI-RS resource pattern 315 may be used for measurement of the total received power over a configured bandwidth part 320 (e.g., as it happens in LBT energy detection (ED)), which can be obtained by CSI-IM with pattern 2 for L1-RSSI computation over the LBT bandwidth. Further, such a reference signal resource pattern allows TDM measurement of total energy at some time instants corresponding with a desired symbol without performing a fast Fourier transform (FFT), which enables faster processing (and reduced power consumption) for the associated interference measurement report. As discussed herein, in some cases interference measurements for receiver-assisted channel access may be used in an associated LBT procedure. FIGS. 4 through 6 illustrate some examples of such procedures.

FIG. 4 illustrates an example of reference signal resources 400 that support techniques for interference measurement reporting for receiver-assisted channel access in accordance with aspects of the present disclosure. In some examples, reference signal resources 400 may implement aspects of wireless communications system 100 or 200. In this example, a LBT procedure may span multiple slots, including first slot 405, second slot 410, third slot 415, and fourth slot 420.

In this example, L1-RSSI measurements may be overloaded for doing LBT, and the L1-RSSI based interference measurements can be also used for LBT purposes. For example, in some cases, (e.g., in 60 GHz communications), a CCA (e.g., an eCCA as defined by ETSI, which may also be referred to as a Cat4 LBT) may be performed based on an initial free channel check of 8 µs and a random counter from 0 to 3 contention slots of 5 µs each. Thus, the maximum duration of the eCCA is around 23 µs in such examples. It is noted that while various examples discussed herein use a 23 µs LBT duration, such timing is provided for purposes of illustration and discussion and techniques as discussed herein may be used for any duration of LBT procedure (e.g., for a "one-shot" LBT or Cat2 LBT, among other examples).

In some cases, a reference signal configuration framework as discussed herein may be able to provision CSI-IM or NZP-CSI-IM for up to 23 µs. In cases where subcarrier spacing (SCS) is 960 kHz (e.g., as may be used in 60 GHz bands), the corresponding symbol duration is approximately 1 µs. In such cases, the CCA, for each beam, can take more than one slot, and less than 2 slots. If multiple beam measurements are done in TDM the reference signal provisioning scales up based on the number of beams. In order to provision reference signal resources, in some cases, provisioning of CSI-RS-Resources may be extended to span over multiple slots by a single aperiodic CSI trigger 425. In the example, of FIG. 4, the trigger 425 may initiate measurement of a set of CSI-RS resources 430 that include resources for a first beam 435 that span the first slot 405 and a portion of the second slot 410, and resources for a second beam 440 that span remaining portions of the second slot 410, third slot 415, and a portion of the fourth slot 420. Such configurations may enable LBT in higher frequency bands (e.g., 60 GHz) with the L1-RSSI based framework. Examples of LBT beam configuration are discussed with reference to FIGS. 5 and 6.

FIG. 5 illustrates an example of reference signal resource sets 500 that support techniques for interference measurement reporting for receiver-assisted channel access in accordance with aspects of the present disclosure. In some examples, reference signal resource sets 500 may implement aspects of wireless communications system 100 or 200. In this example, a LBT procedure may span multiple slots, including first slot 540, second slot 545, and third slot 550

In this example, a CSI resource configuration 505 may provide a CSI resource set 510. The CSI resource set 510 may include multiple CSI resources 520 that in this example include CSI-Resource1 that is associated with a first beam 525, CSI-Resource2 that is associated with a second beam 530, and CSI-Resource3 that is associated with a third beam 535. In this example, time domain provisioning of CSI resources may be provided that allow for performance of an LBT procedure. In some cases, each CSI-Resource may have an associated repetition, that allows the repetition of CSI resources of the aperiodic CSI reporting framework in order to achieve the desired time provisioning of reference signals for LBT purposes. In some cases, repetition information may be provided as a periodicity in symbol-level granularity. Further, the configuration may provide a reference symbol offset that indicates where to apply the pattern indicated in with the CSI resources 520 (e.g., in a single resource configuration table) that allows for CSI resources 520 to extend beyond one slot. In some cases, configuration information for the offset and repetition may be provided in a resourceMapping information item of a Csi-Resource table. In the example of FIG. 5, three beams may be configured for a CCA equivalent to 14 symbols, where the first slot 540 is associated with CSI-Resource1 that has a symbol offset of 0 and a repetition of 14 symbols, the second slot 545 is associated with CSI-Resource2 that has a symbol offset of 14 and a repetition of 14 symbols, and the third slot 550 is associated with CSI-Resource3 that has a symbol offset of 28 and a repetition of 14 symbols. In some cases, the CSI-resource information may be associated with QCL information (e.g., Qcl-info in Csi-Resource-Config) that is provided per resource in each CSI resource 520 of CSI resource set 510.

FIG. 6 illustrates another example of reference signal resource sets 600 that support techniques for interference measurement reporting for receiver-assisted channel access in accordance with aspects of the present disclosure. In some examples, reference signal resource sets 600 may implement aspects of wireless communications system 100 or 200. In this example, a LBT procedure may span multiple slots, including first slot 640, second slot 645, and third slot 650

In this example, a CSI resource configuration 605 may provide multiple CSI resource sets 610. The CSI resource sets 610 may include multiple CSI resources 620 that in this example include CSI-Resource1 that is associated with a first beam 625, CSI-Resource2 that is associated with a second beam 630, and CSI-Resource3 that is associated with a third beam 635. In this example, time domain provisioning of CSI resources may be provided that allow for performance of an LBT procedure through providing N CSI resource sets 610 in the CSI resource configuration 605 that define the per-symbol resources for the LBT procedure. In such cases, the number of CSI resource sets 610 per CSI resource configuration 605 may be expanded to the desired number of symbols to cover the longest CCA (e.g., 23 μs). The pattern of each CSI-RS-Resource, as illustrated in table 655, may be referenced with a symbol offset from first symbol of the slot where the CSI-RS is activated, that goes beyond the slot boundary (e.g., >14), and the maximum number of resources that can be defined may correspond to the number of symbols and beams (e.g., >63).

In the example of FIG. 6, three beams may be configured for a CCA equivalent to 14 symbols, where the first slot 640 is associated with resources R1,1 through R14,1 in table 655 (corresponding to offsets 0 through 13 from a reference symbol), that each correspond to first beam 625. The second slot 645 in this example is associated with resources R1,2 through R14,2 in table 655 (corresponding to offsets 14 through 27 from the reference symbol), that each correspond to second beam 630. The third slot 650 in this example is associated with resources R1,3 through R14,3 in table 655 (corresponding to offsets 28 through 41 from the reference symbol), that each correspond to third beam 635. In some cases, the CSI-resource information may be associated with QCL information (e.g., Qcl-info in Csi-Resource-Config) that is provided per resource in each CSI resource 620 of CSI resource set 610.

Figure 7:
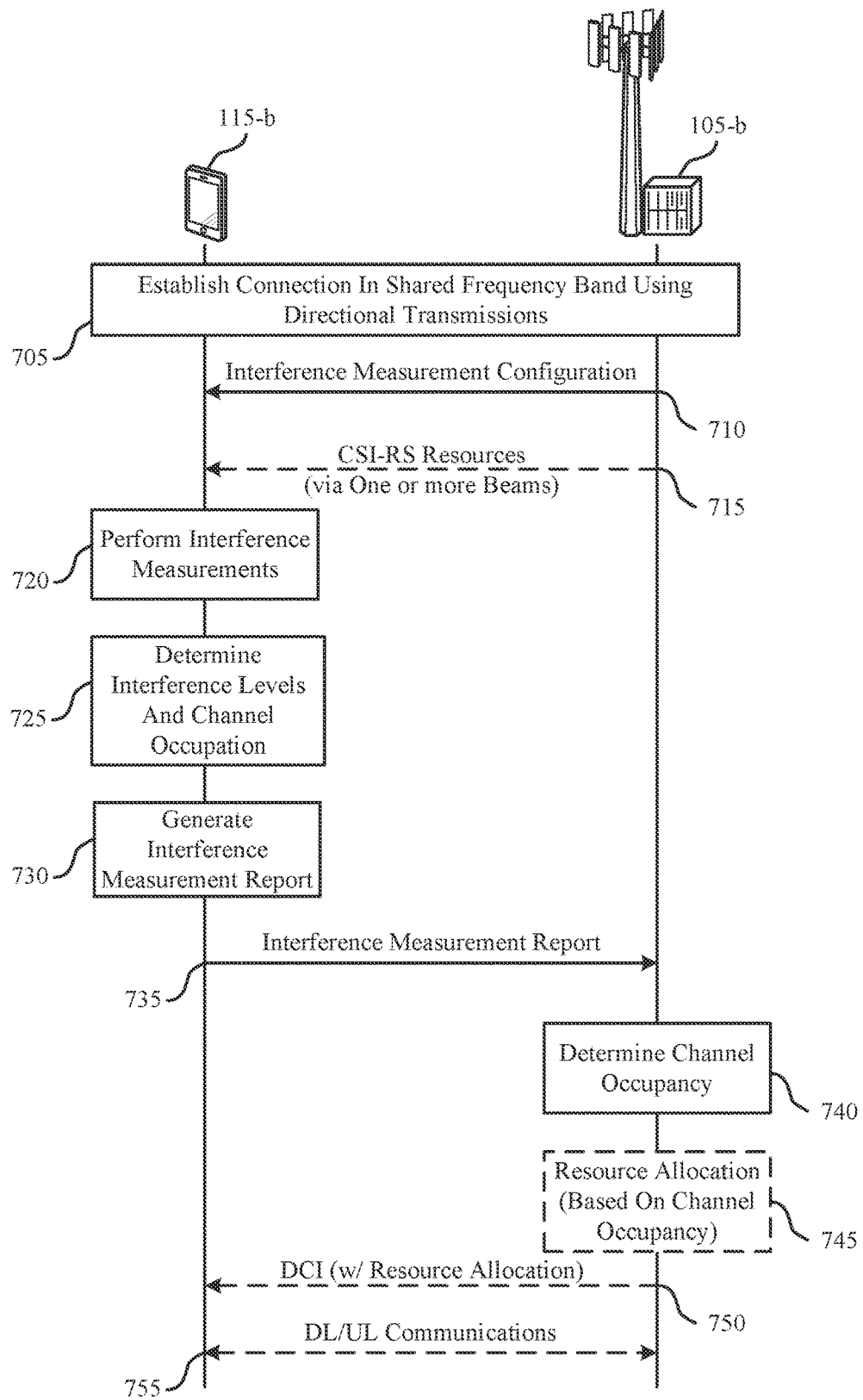
FIG. 7 illustrates an example of a process flow that supports techniques for interference measurement reporting for receiver-assisted channel access in accordance with aspects of the present disclosure.

FIG. 7 illustrates an example of a process flow 700 that supports techniques for interference measurement reporting for receiver-assisted channel access in accordance with aspects of the present disclosure. In some examples, process flow 700 may implement aspects of wireless communications system 100 or 200. Process flow 700 may be implemented by a UE 115-b and an access network entity such as a base station 105-b as described herein. In the following description of the process flow 700, the communications between the UE 115-b and the base station 105-b may be transmitted in a different order than the example order shown, or the operations performed by the UE 115-b and base station 105-b may be performed in different orders or at different times. Some operations may also be omitted from the process flow 700, and other operations may be added to the process flow 700.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 705, the base station 105-b and UE 115-b may establish a connection that uses shared radio frequency spectrum that uses directional transmissions. For example, the connection may be established that uses a 60 GHz Fr2x bandwidth (either alone or in combination with one or more other communication bandwidths in licensed or unlicensed frequency bands). The connection establishment procedure may be a RRC connection establishment according to established RRC connection procedures, for example.

At 710, the base station 105-b may transmit an interference measurement configuration to the UE 115-b. In some cases, the interference measurement configuration may be provided with CSI configuration information, and may configure reference signal resources that span a channel bandwidth (e.g., one or multiple RBs in a symbol). In some cases, the interference measurement configuration may provide time domain information that indicates resources that span a time period for an LBT procedure. At 715, the base station 105-b may schedule CSI-RS resources to provide CSI-RS transmissions, or to provide that that no transmissions are present, to allow for the UE 115-b to perform interference measurements.

At 720, the UE 115-b may perform interference measurements. In some cases, the UE 115-b may measure RSSI for one or more beams based on the measurement configuration. In some cases, the interference measurements may span a time duration associated with an LBT procedure.

At 725, the UE 115-b may determine interference levels and channel occupation based on the interference measurements. In some cases, one or more interference threshold levels may be provided, and RSSI measurements may be compared against the one or more interference threshold levels to determine whether the channel is occupied, or a level of channel occupancy (e.g., where communications can withstand some amount of interference, and transmission techniques such as coding rate or a modulation and coding scheme (MCS) that may be adjusted based on the occupancy level).

At 730, the UE 115-*b* may generate an interference measurement report. In some cases, the UE 115-*b* may report an RSSI measurement for the configured CSI-RS resources. In some cases, the interference measurement report may include a channel occupancy indication, or a quantized level of channel occupation (e.g., based on multiple configured interference threshold levels). In some cases, the interference measurement report may include interference measurement information for one or multiple beams. At 735, the UE 115-*b* may transmit the interference measurement report to the base station 105-*b*.

At 740, the base station 105-*b* may determine channel occupancy based on the interference measurement report. In some cases, the base station 105-*b* may also perform a channel occupancy determination (e.g., an LBT) to determine channel occupancy measurements at the base station 105-*b*. In cases where it is determined that the channel is available for communications, at 745, the base station 105-*b* may determine a resource allocation for communications with the UE 115-*b*. At 750, in cases, where the channel is available, the base station 105-*b* may transmit a DCI that indicates the resource allocation, and at 755 the base station 105-*b* and UE 115-*b* may communicate using uplink and downlink communications.

Figure 8:
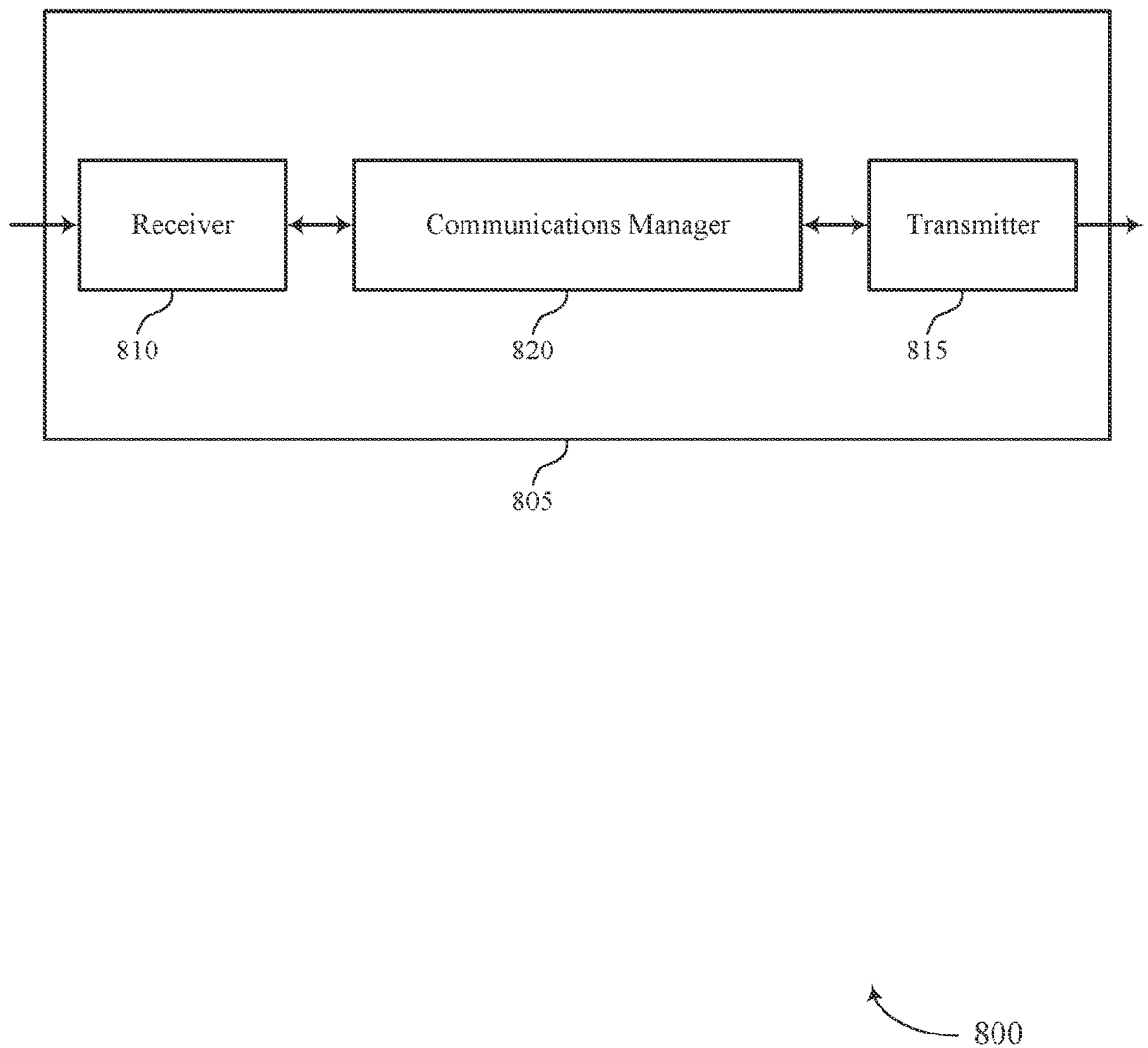
FIGS. 8 and 9 show block diagrams of devices that support techniques for interference measurement reporting for receiver-assisted channel access in accordance with aspects of the present disclosure.

FIG. 8 shows a block diagram 800 of a device 805 that supports techniques for interference measurement reporting for receiver-assisted channel access in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for interference measurement reporting for receiver-assisted channel access). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for interference measurement reporting for receiver-assisted channel access). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for interference measurement reporting for receiver-assisted channel access as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from an access network entity, an indication to provide an interference measurement report based on one or more signals transmitted by the access network entity. The communications manager 820 may be configured as or otherwise support a means for receiving the one or more signals transmitted by the access network entity. The communications manager 820 may be configured as or otherwise support a means for transmitting, to the access network entity, the interference measurement report based on one or more interference levels of the one or more received signals, where the one or more interference levels indicate channel occupation of an associated channel bandwidth of the one or more signals.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for receiver-assisted channel access that provide interference measurements for a channel bandwidth with relatively low processing and power consumption, that may provide for reliable communications through determination of channel occupancy at both a receiver and a transmitter.

Figure 9:
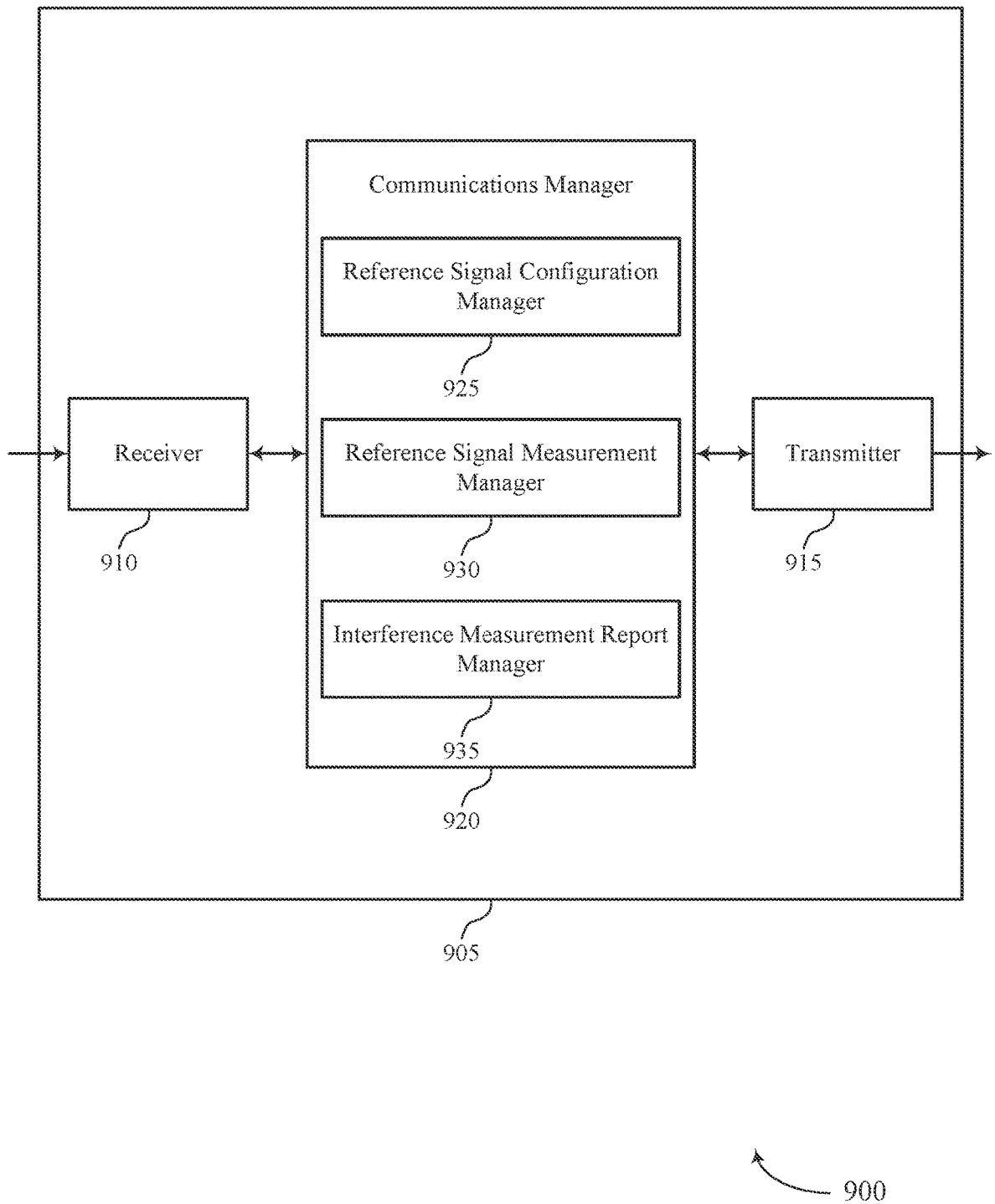

FIG. 9 shows a block diagram 900 of a device 905 that supports techniques for interference measurement reporting for receiver-assisted channel access in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for interference measurement reporting for receiver-assisted channel access). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for interference measurement reporting for receiver-assisted channel access). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for interference measurement reporting for receiver-assisted channel access as described herein. For example, the communications manager 920 may include a reference signal configuration manager 925, a reference signal measurement manager 930, an interference measurement report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The reference signal configuration manager 925 may be configured as or otherwise support a means for receiving, from an access network entity, an indication to provide an interference measurement report based on one or more signals transmitted by the access network entity. The reference signal measurement manager 930 may be configured as or otherwise support a means for receiving the one or more signals transmitted by the access network entity. The interference measurement report manager 935 may be configured as or otherwise support a means for transmitting, to the access network entity, the interference measurement report based on one or more interference levels of the one or more received signals, where the one or more interference levels indicate channel occupation of an associated channel bandwidth of the one or more signals.

Figure 10:
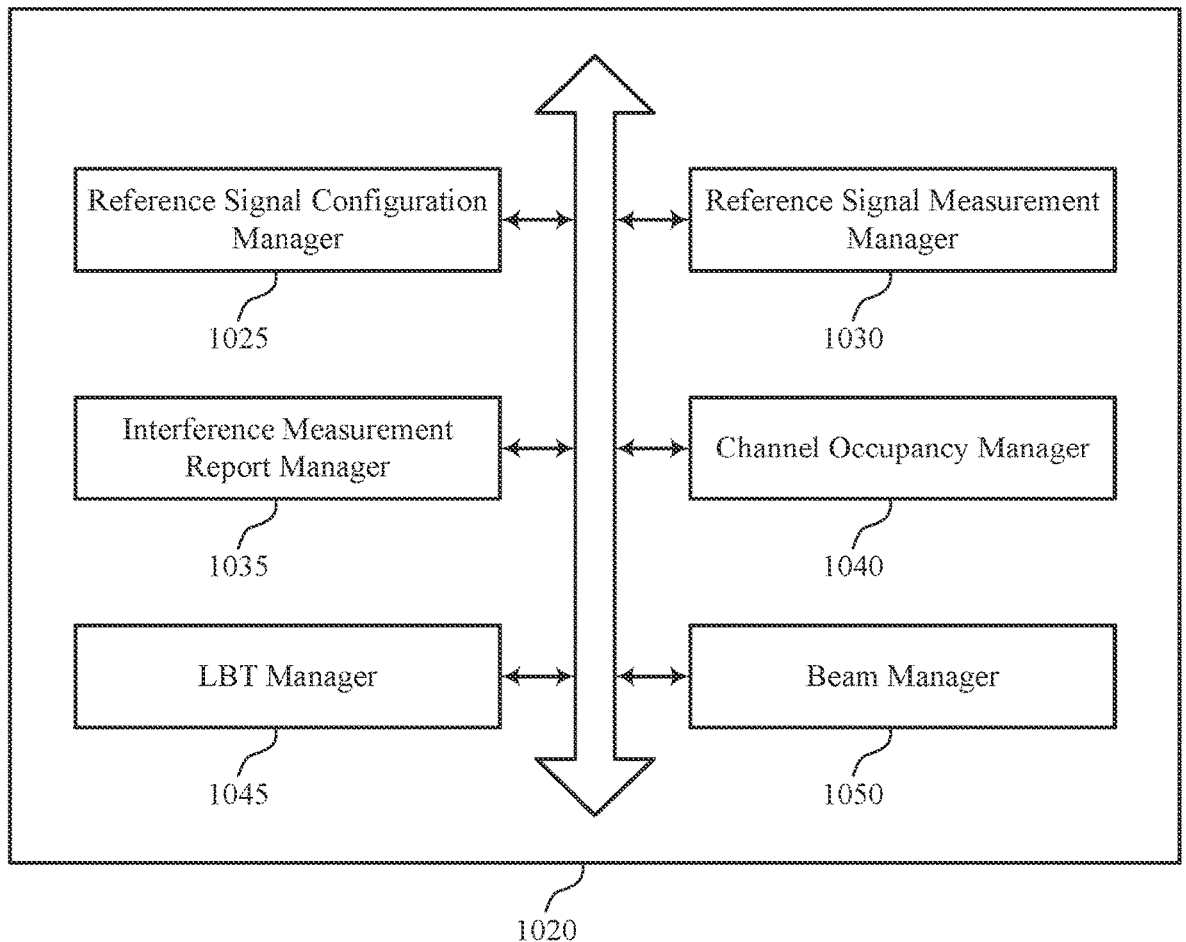
FIG. 10 shows a block diagram of a communications manager that supports techniques for interference measurement reporting for receiver-assisted channel access in accordance with aspects of the present disclosure.

FIG. 10 shows a block diagram 1000 of a communications manager 1020 that supports techniques for interference measurement reporting for receiver-assisted channel access in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for interference measurement reporting for receiver-assisted channel access as described herein. For example, the communications manager 1020 may include a reference signal configuration manager 1025, a reference signal measurement manager 1030, an interference measurement report manager 1035, a channel occupancy manager 1040, an LBT manager 1045, a beam manager 1050, or any combination thereof. Each of these components may communicate, directly or indirectly, with one another (e.g., via one or more buses).

The communications manager 1020 may support wireless communication at a UE in accordance with examples as disclosed herein. The reference signal configuration manager 1025 may be configured as or otherwise support a means for receiving, from an access network entity, an indication to provide an interference measurement report based on one or more signals transmitted by the access network entity. The reference signal measurement manager 1030 may be configured as or otherwise support a means for receiving the one or more signals transmitted by the access network entity. The interference measurement report manager 1035 may be configured as or otherwise support a means for transmitting, to the access network entity, the interference measurement report based on one or more interference levels of the one or more received signals, where the one or more interference levels indicate channel occupation of an associated channel bandwidth of the one or more signals.

In some examples, the one or more interference levels provide a wideband interference measurement across a channel bandwidth of a communications channel between the UE and the access network entity. In some examples, the wideband interference measurement across the channel bandwidth of the communications channel indicates channel occupation for a receiver-assisted channel access procedure.

In some examples, to support identifying, the reference signal measurement manager 1030 may be configured as or otherwise support a means for measuring a received signal strength of each of a set of multiple resource elements of the one or more signals. In some examples, to support identifying, the reference signal measurement manager 1030 may be configured as or otherwise support a means for summing the received signal strength measurements to generate a received signal strength indicator (RSSI) that is provided in the interference measurement report.

In some examples, to support measuring, the reference signal measurement manager 1030 may be configured as or otherwise support a means for measuring the one or more signals for a set of multiple beams based on a set of multiple transmission configuration indicator (TCI) states that are provided in a configuration for the interference measurement report. In some examples, the interference measurement report provides L1-RSSI measurements over the one or more signals.

In some examples, to support transmitting the interference measurement report, the interference measurement report manager 1035 may be configured as or otherwise support a means for reporting a set of multiple measurements for a set of multiple beams, where each beam of the set of multiple beams is associated with a configured resource of a signal resource set.

In some examples, the channel occupancy manager 1040 may be configured as or otherwise support a means for comparing the one or more measured interference levels associated with a first signal of the one or more signals to one or more threshold values. In some examples, the channel occupancy manager 1040 may be configured as or otherwise support a means for setting a channel occupation status of the associated channel bandwidth based on the comparing, and where the channel occupation status is provided with the interference measurement report. In some examples, the channel occupation status is a multi-level occupation status that is determined based on multiple threshold values that are compared to the one or more measured interference levels associated with the first signal. In some examples, the multiple threshold values are configured by RRC signaling, in an activation DCI, or any combinations thereof.

In some examples, the reference signal configuration manager 1025 may be configured as or otherwise support a means for receiving, from the access network entity, a measurement report configuration that indicates resources for the one or more signals. In some examples, the resources for the one or more signals include CSI-IM resources or non-zero-power CSI-IM. In some examples, the measurement report configuration further indicates beam information for one or more beams associated with one or more signals. In some examples, the beam information is included in the measurement report configuration in a beam indication field for one or more types of signals. In some examples, the beam information is derived based on a signal spatial QCL, or QCL Type D, for one or more interference measurement resources.

In some examples, the one or more signals are each transmitted in a set of multiple resource elements that span the associated channel bandwidth of the associated signal. In some examples, the one or more signals provide for time domain multiplexed interference measurements prior to performing a fast Fourier transform (FFT) on signal resources.

In some examples, the one or more signals span time resources associated with an LBT procedure associated with the receiver-assisted channel access procedure. In some examples, each signal of the one or more signals are configured with a number of repetitions at symbol-level granularity and an offset relative to a starting symbol to provide resources that span the time resources associated with the LBT procedure. In some examples, each signal of the one or more signals are configured in set of multiple resource sets associated with a set of multiple symbols that span the time resources associated with the LBT procedure.

Figure 11:
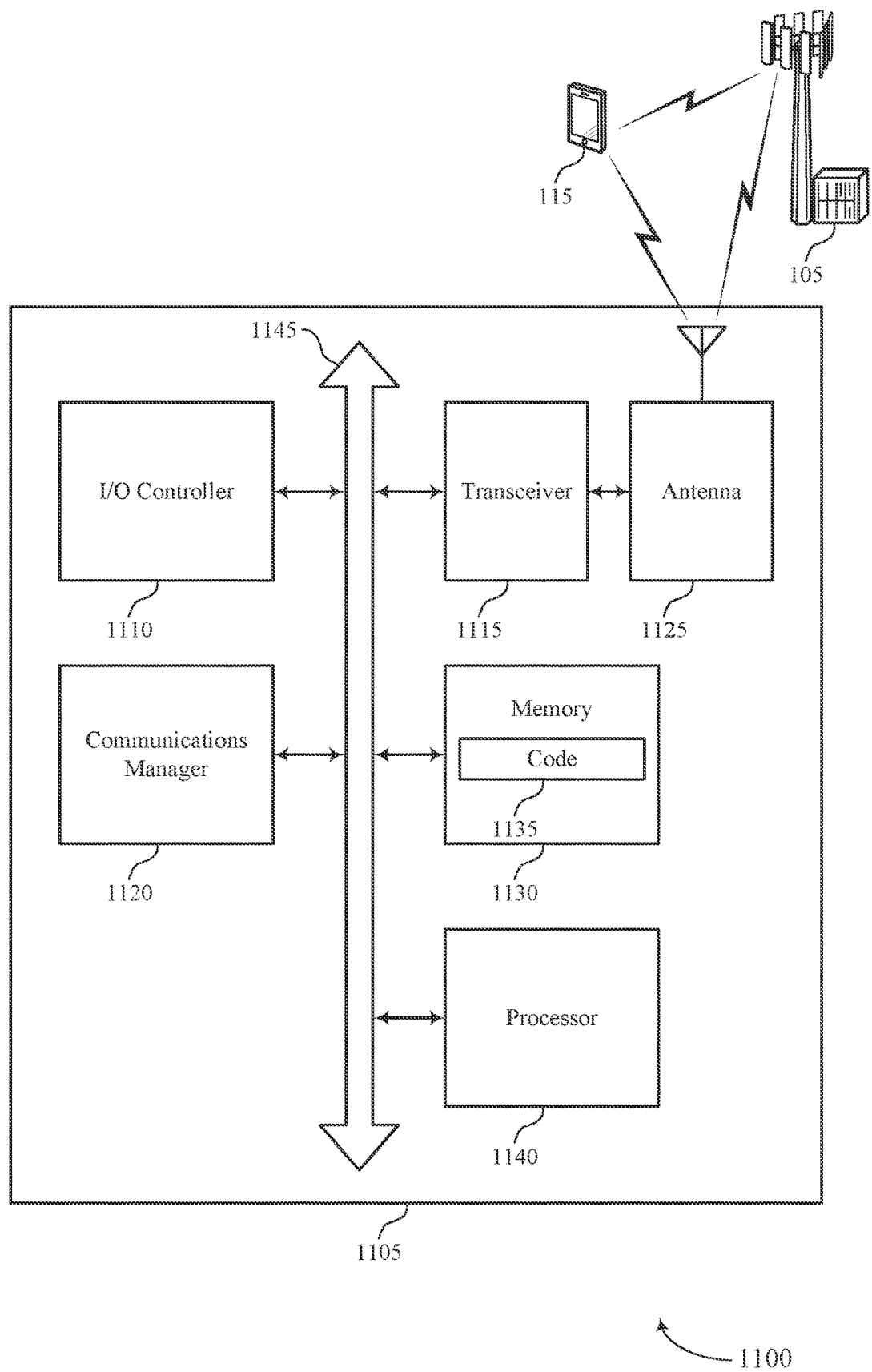
FIG. 11 shows a diagram of a system including a device that supports techniques for interference measurement reporting for receiver-assisted channel access in accordance with aspects of the present disclosure.

FIG. 11 shows a diagram of a system 1100 including a device 1105 that supports techniques for interference measurement reporting for receiver-assisted channel access in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The U/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for interference measurement reporting for receiver-assisted channel access). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from an access network entity, an indication to provide an interference measurement report based on one or more signals transmitted by the access network entity. The communications manager 1120 may be configured as or otherwise support a means for receiving the one or more signals transmitted by the access network entity. The communications manager 1120 may be configured as or otherwise support a means for transmitting, to the access network entity, the interference measurement report based on the one or more interference levels of the one or more received signals, where the one or more interference levels indicate channel occupation of an associated channel bandwidth of the one or more signals.

By including or configuring the communications manager 1120 in accordance with examples as described herein, the device 1105 may support techniques for receiver-assisted channel access that provide interference measurements for a channel bandwidth with relatively low processing and power consumption, that may provide for reliable communications through determination of channel occupancy at both a receiver and a transmitter, and that may thus provide for improved user experience, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for interference measurement reporting for receiver-assisted channel access as described herein, or the processor 1140 and the memory 1130 may be otherwise configured to perform or support such operations.

Figure 12:
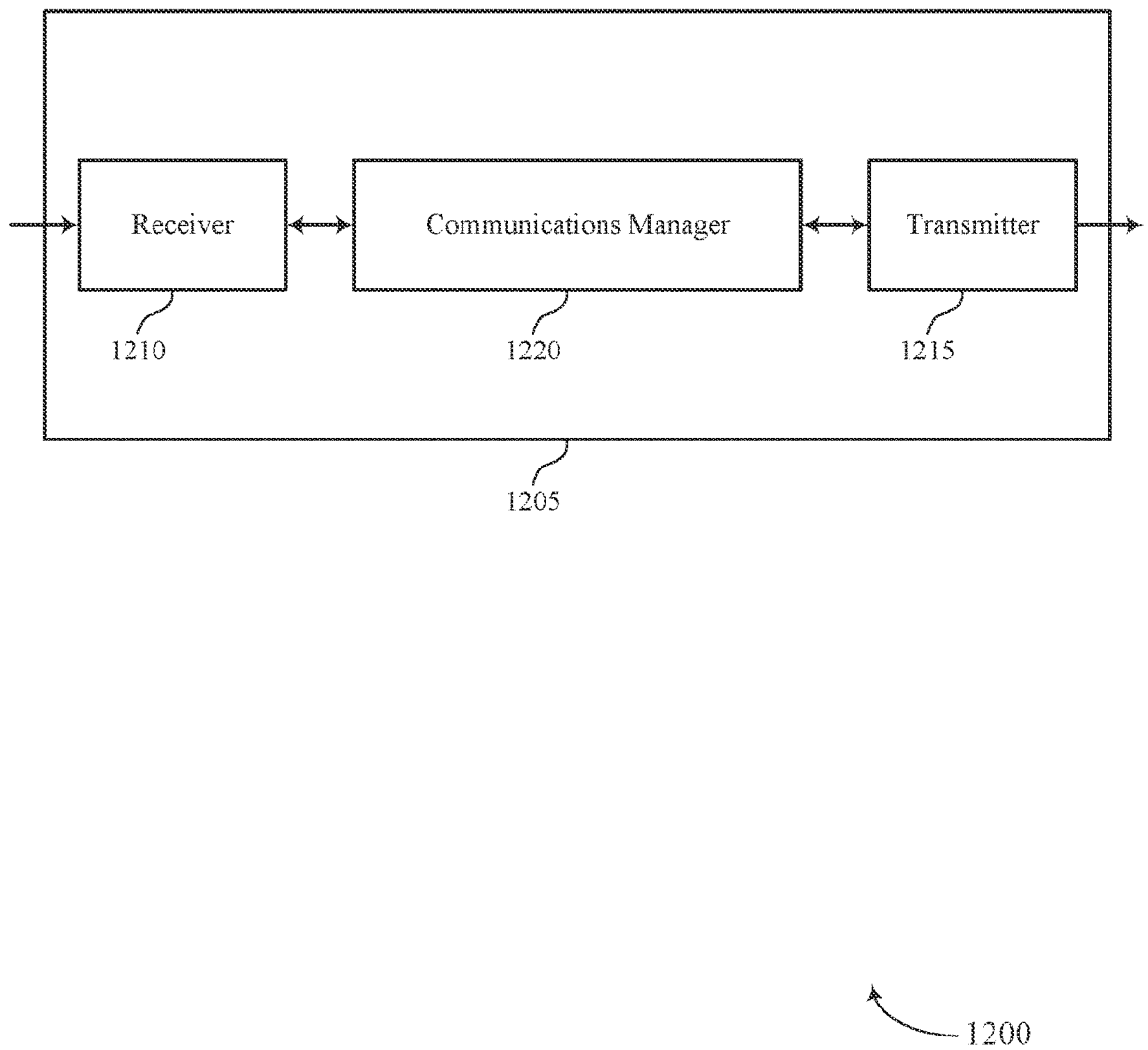
FIGS. 12 and 13 show block diagrams of devices that support techniques for interference measurement reporting for receiver-assisted channel access in accordance with aspects of the present disclosure.

FIG. 12 shows a block diagram 1200 of a device 1205 that supports techniques for interference measurement reporting for receiver-assisted channel access in accordance with aspects of the present disclosure. The device 1205 may be an example of aspects of an access network entity or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for interference measurement reporting for receiver-assisted channel access). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for interference measurement reporting for receiver-assisted channel access). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for interference measurement reporting for receiver-assisted channel access as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at an access network entity in accordance with examples as disclosed herein. For example, the communications manager 1220 may be configured as or otherwise support a means for transmitting an indication to provide an interference measurement report based on one or more signals transmitted by the access network entity. The communications manager 1220 may be configured as or otherwise support a means for transmitting the one or more signals in a set of signal resources that span a channel bandwidth of a communications channel between a UE and the access network entity. The communications manager 1220 may be configured as or otherwise support a means for receiving, from the UE, the interference measurement report that indicates, for the one or more signals, measured interference levels at the UE.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for receiver-assisted channel access that provide interference measurements for a channel bandwidth with relatively low processing and power consumption, that may provide for reliable communications through determination of channel occupancy at both a receiver and a transmitter.

Figure 13:
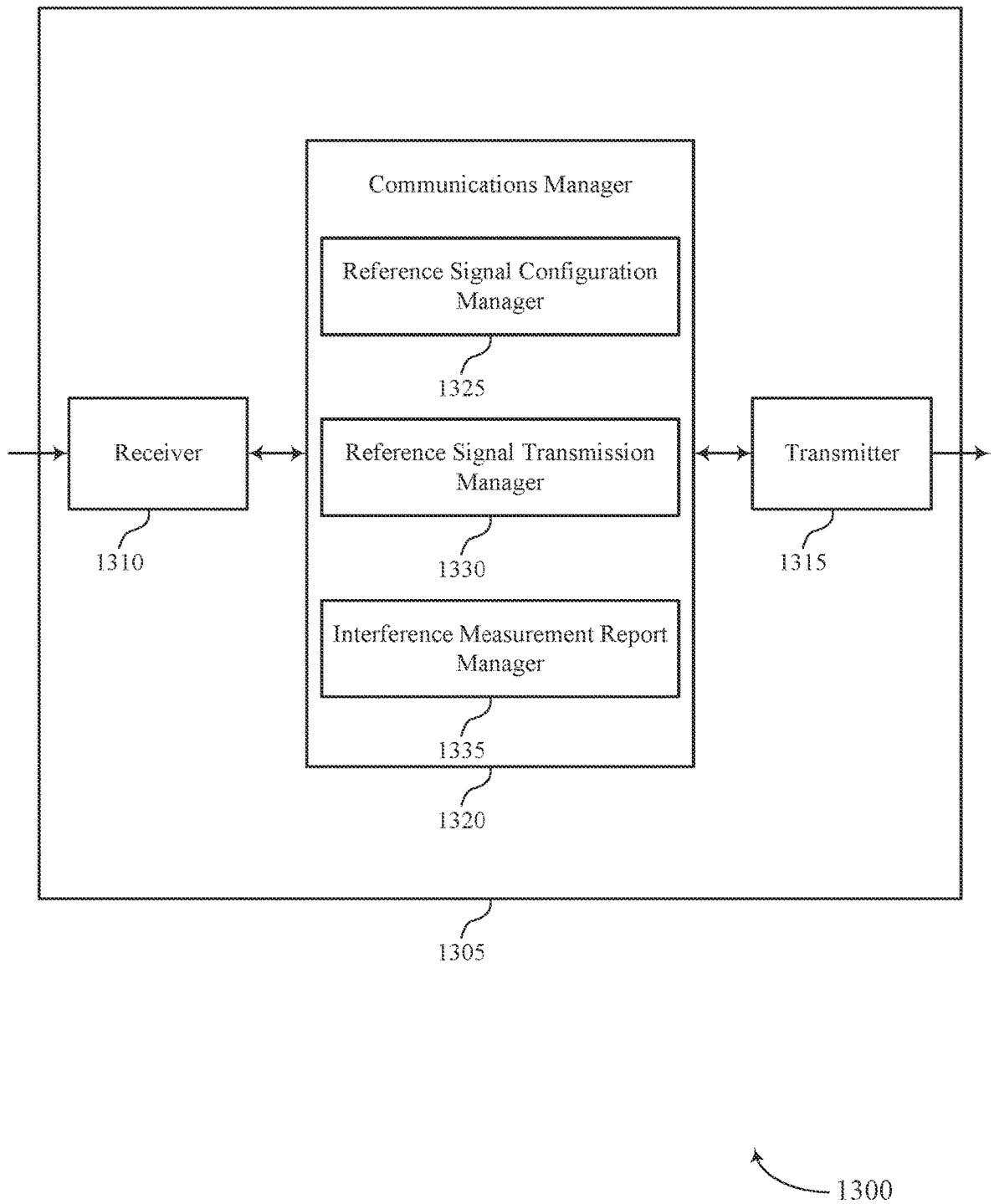

FIG. 13 shows a block diagram 1300 of a device 1305 that supports techniques for interference measurement reporting for receiver-assisted channel access in accordance with aspects of the present disclosure. The device 1305 may be an example of aspects of a device 1205, an access network entity, or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for interference measurement reporting for receiver-assisted channel access). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for interference measurement reporting for receiver-assisted channel access). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for interference measurement reporting for receiver-assisted channel access as described herein. For example, the communications manager 1320 may include a reference signal configuration manager 1325, a reference signal transmission manager 1330, an interference measurement report manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at an access network entity in accordance with examples as disclosed herein. The reference signal configuration manager 1325 may be configured as or otherwise support a means for transmitting an indication to provide an interference measurement report based on one or more signals transmitted by the access network entity. The reference signal transmission manager 1330 may be configured as or otherwise support a means for transmitting the one or more signals in a set of signal resources that span a channel bandwidth of a communications channel between a UE and the access network entity. The interference measurement report manager 1335 may be configured as or otherwise support a means for receiving, from the UE, the interference measurement report that indicates, for the one or more signals, measured interference levels at the UE.

Figure 14:
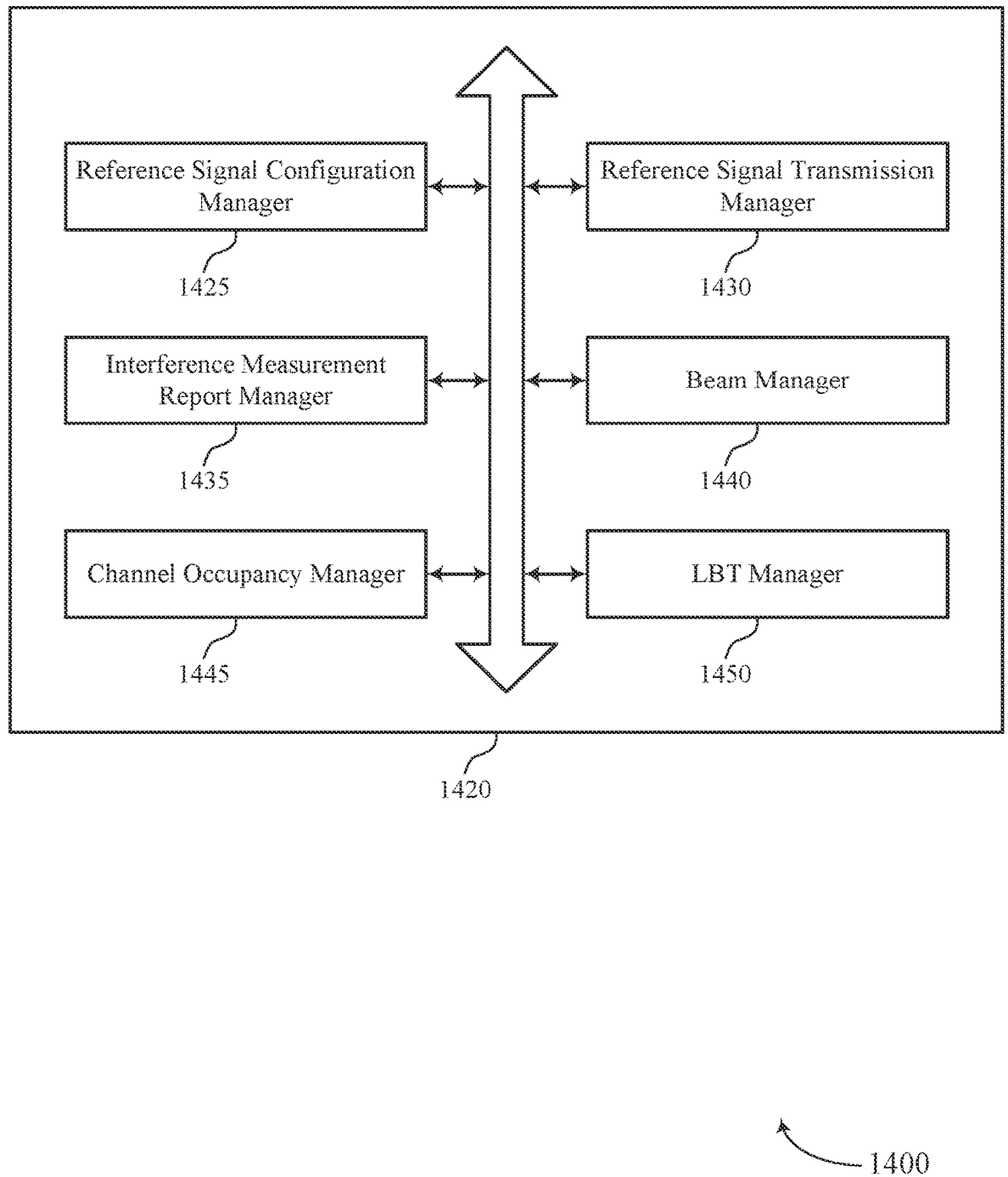
FIG. 14 shows a block diagram of a communications manager that supports techniques for interference measurement reporting for receiver-assisted channel access in accordance with aspects of the present disclosure.

FIG. 14 shows a block diagram 1400 of a communications manager 1420 that supports techniques for interference measurement reporting for receiver-assisted channel access in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for interference measurement reporting for receiver-assisted channel access as described herein. For example, the communications manager 1420 may include a reference signal configuration manager 1425, a reference signal transmission manager 1430, an interference measurement report manager 1435, a beam manager 1440, a channel occupancy manager 1445, an LBT manager 1450, or any combination thereof. Each of these components may communicate, directly or indirectly, with one another (e.g., via one or more buses).

The communications manager 1420 may support wireless communication at an access network entity in accordance with examples as disclosed herein. The reference signal configuration manager 1425 may be configured as or otherwise support a means for transmitting an indication to provide an interference measurement report based on one or more signals transmitted by the access network entity. The reference signal transmission manager 1430 may be configured as or otherwise support a means for transmitting the one or more signals in a set of reference signal resources that span a channel bandwidth of a communications channel between a UE and the access network entity. The interference measurement report manager 1435 may be configured as or otherwise support a means for receiving, from the UE, the interference measurement report that indicates, for the one or more signals, measured interference levels at the UE.

In some examples, the measured interference levels provide a wideband interference measurement across a channel bandwidth of the communications channel between the UE and the access network entity. In some examples, the wideband interference measurement across the channel bandwidth of the communications channel indicates channel occupation for a receiver-assisted channel access procedure. In some examples, the interference measurement report indicates a RSSI for the one or more signals for the associated channel bandwidth.

In some examples, the beam manager 1440 may be configured as or otherwise support a means for configuring the UE with a set of multiple TCI states for a set of multiple beams, and where the indication to provide the interference measurement report indicates one or more of the TCI states. In some examples, the interference measurement report provides L1-RSSI measurements over the one or more signals.

In some examples, to support receiving the interference measurement report, the beam manager 1440 may be configured as or otherwise support a means for receiving a set of multiple measurements for a set of multiple beams, and where each beam of the set of multiple beams is associated with a configured resource of a signal resource set.

In some examples, the channel occupancy manager 1445 may be configured as or otherwise support a means for determining a channel occupation status of the channel bandwidth based on the measured interference levels provided in the interference measurement report. In some examples, the channel occupation status is a multi-level occupation status that is indicated by the interference measurement report based on multiple threshold values that are compared to the measured interference levels. In some examples, the multiple threshold values are configured by RRC signaling, in an activation DCI, or any combinations thereof.

In some examples, the reference signal configuration manager 1425 may be configured as or otherwise support a means for transmitting a measurement report configuration that indicates resources for the one or more signals. In some examples, the resources for the one or more signals include CSI-IM resources or non-zero-power CSI-IM. In some examples, the measurement report configuration further indicates beam information for one or more beams associated with one or more signals.

In some examples, the beam information is included in the measurement report configuration in a beam indication field for one or more types of signals. In some examples, the beam information is derived based on a reference signal spatial QCL, or QCL Type D, for one or more interference measurement resources. In some examples, the beam information is provided in one or more explicit QCL information fields, or is derived from a beam associated with one or more synchronization signals, reference signals, beam selection signals, or control signals.

In some examples, the one or more signals are each transmitted in a set of multiple resource elements that span the channel bandwidth of the associated signal. In some examples, the one or more signals provide for time domain multiplexed interference measurements prior to performing a FFT on signal resources.

In some examples, the one or more signals span time resources associated with an LBT procedure associated with the receiver-assisted channel access procedure. In some examples, each reference signal of the one or more signals are configured with a number of repetitions at symbol-level granularity and an offset relative to a starting symbol to provide resources that span the time resources associated with the LBT procedure. In some examples, each signal of the one or more signals are configured in set of multiple resource sets associated with a set of multiple symbols that span the time resources associated with the LBT procedure.

Figure 15:
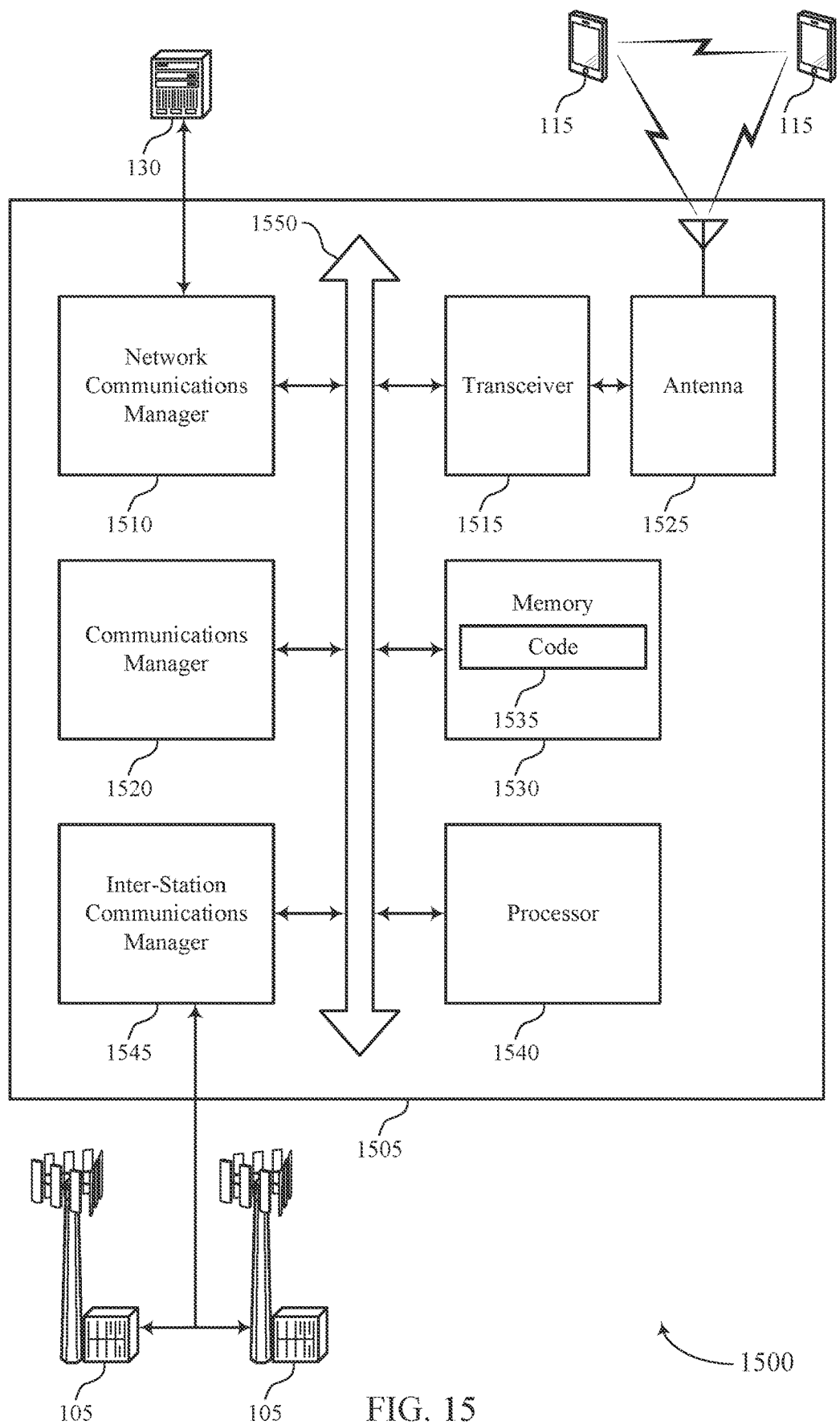
FIG. 15 shows a diagram of a system including a device that supports techniques for interference measurement reporting for receiver-assisted channel access in accordance with aspects of the present disclosure.

FIG. 15 shows a diagram of a system 1500 including a device 1505 that supports techniques for interference measurement reporting for receiver-assisted channel access in accordance with aspects of the present disclosure. The device 1505 may be an example of or include the components of a device 1205, a device 1305, an access network entity, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for interference measurement reporting for receiver-assisted channel access). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at an access network entity in accordance with examples as disclosed herein. For example, the communications manager 1520 may be configured as or otherwise support a means for transmitting an indication to provide an interference measurement report based on one or more signals transmitted by the access network entity. The communications manager 1520 may be configured as or otherwise support a means for transmitting the one or more signals in a set of signal resources that span a channel bandwidth of a communications channel between a UE and the access network entity. The communications manager 1520 may be configured as or otherwise support a means for receiving, from the UE, the interference measurement report that indicates, for the one or more signals, measured interference levels at the UE.

By including or configuring the communications manager 1520 in accordance with examples as described herein, the device 1505 may support techniques for receiver-assisted channel access that provide interference measurements for a channel bandwidth with relatively low processing and power consumption, that may provide for reliable communications through determination of channel occupancy at both a receiver and a transmitter.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for interference measurement reporting for receiver-assisted channel access as described herein, or the processor 1540 and the memory 1530 may be otherwise configured to perform or support such operations.

Figure 16:
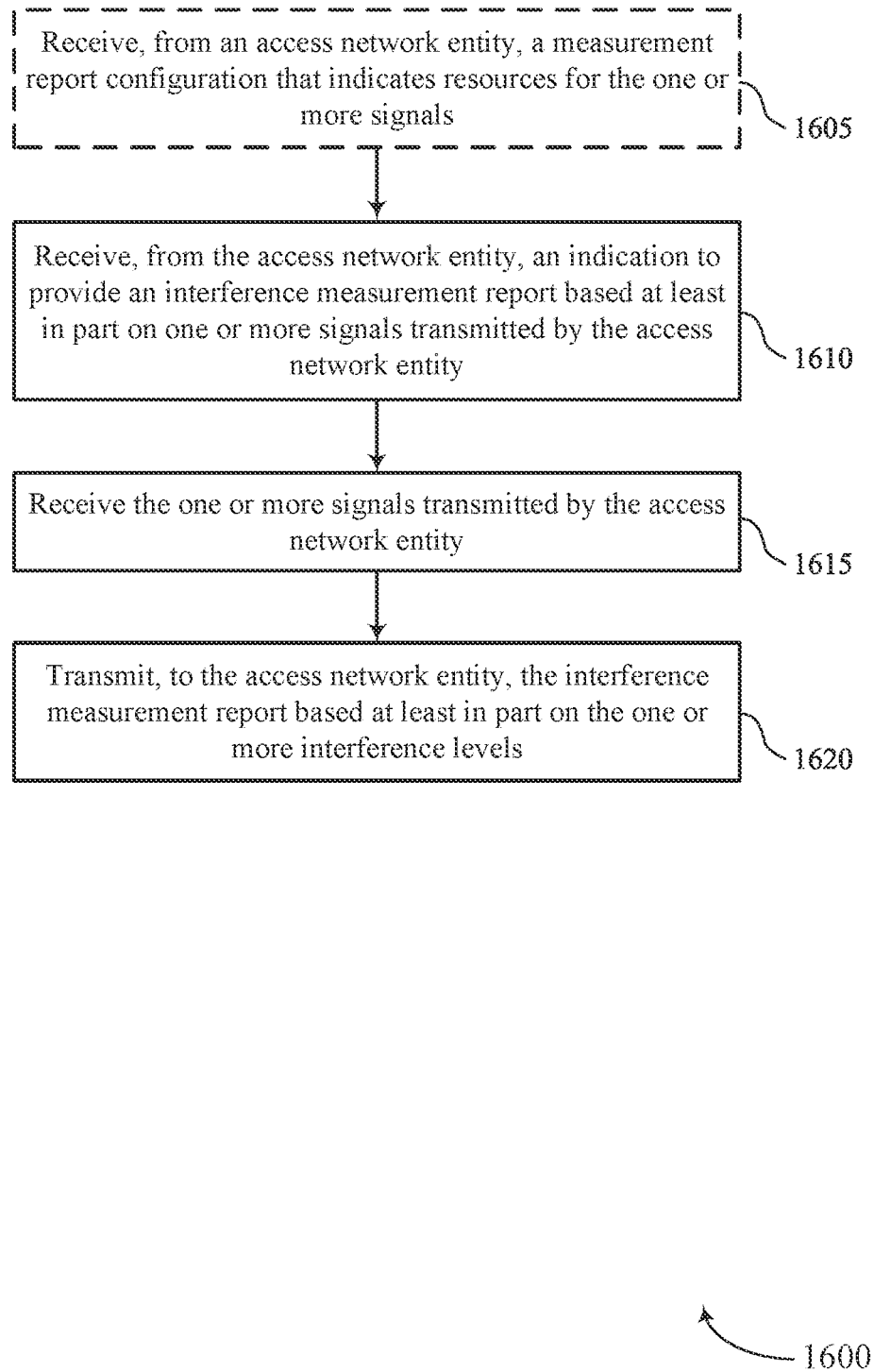
FIGS. 16 through 20 show flowcharts illustrating methods that support techniques for interference measurement reporting for receiver-assisted channel access in accordance with aspects of the present disclosure.

FIG. 16 shows a flowchart illustrating a method 1600 that supports techniques for interference measurement reporting for receiver-assisted channel access in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

Optionally, at 1605, the method may include receiving, from an access network entity, a measurement report configuration that indicates resources for the one or more signals. The operations of 1605 may be performed in accordance with examples as disclosed herein. In some examples, aspects of the operations of 1605 may be performed by a reference signal configuration manager 1025 as described with reference to FIG. 10. In some cases, the resources for the one or more reference signals include CSI-IM or non-zero-power CSI-IM resources.

At 1610, the method may include receiving, from the access network entity, an indication to provide an interference measurement report based on one or more signals transmitted by the access network entity. The operations of 1610 may be performed in accordance with examples as disclosed herein. In some examples, aspects of the operations of 1610 may be performed by a reference signal configuration manager 1025 as described with reference to FIG. 10.

At 1615, the method may include receiving the one or more signals transmitted by the access network entity. The operations of 1615 may be performed in accordance with examples as disclosed herein. In some examples, aspects of the operations of 1615 may be performed by a reference signal measurement manager 1030 as described with reference to FIG. 10.

At 1620, the method may include transmitting, to the access network entity, the interference measurement report based on one or more interference levels of the one or more received signals, where the one or more interference levels indicate channel occupation of an associated channel bandwidth of the one or more signals. The operations of 1620 may be performed in accordance with examples as disclosed herein. In some examples, aspects of the operations of 1620 may be performed by an interference measurement report manager 1035 as described with reference to FIG. 10.

Figure 17:
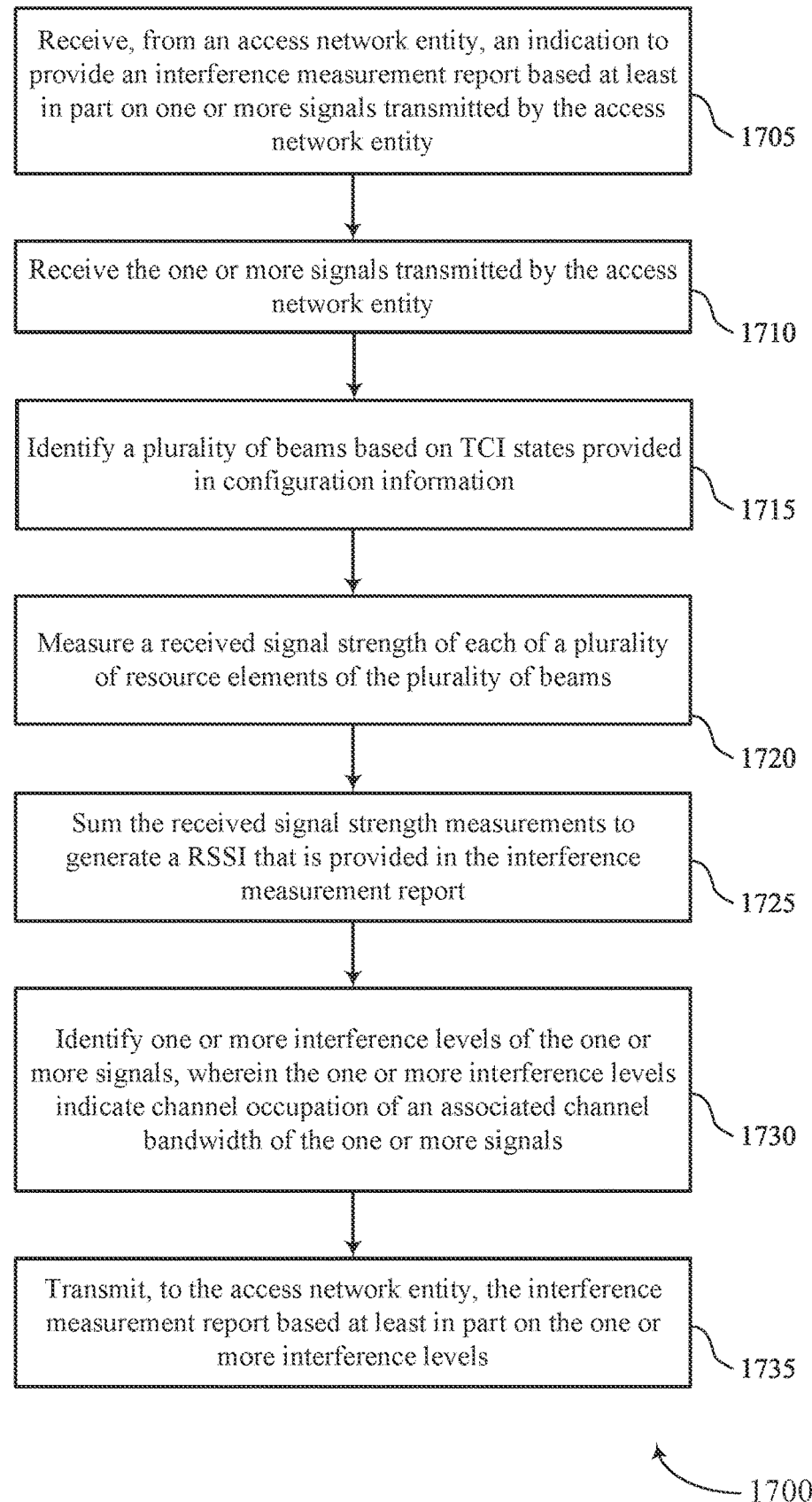

FIG. 17 shows a flowchart illustrating a method 1700 that supports techniques for interference measurement reporting for receiver-assisted channel access in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from an access network entity, an indication to provide an interference measurement report based on one or more signals transmitted by the access network entity. The operations of 1705 may be performed in accordance with examples as disclosed herein. In some examples, aspects of the operations of 1705 may be performed by a reference signal configuration manager 1025 as described with reference to FIG. 10.

At 1710, the method may include receiving the one or more signals transmitted by the access network entity. The operations of 1710 may be performed in accordance with examples as disclosed herein. In some examples, aspects of the operations of 1710 may be performed by a reference signal measurement manager 1030 as described with reference to FIG. 10.

At 1715, the method may include identifying a set of multiple beams based on a set of multiple TCI states that are provided in a configuration for the interference measurement report. The operations of 1715 may be performed in accordance with examples as disclosed herein. In some examples, aspects of the operations of 1715 may be performed by a reference signal measurement manager 1030 as described with reference to FIG. 10.

At 1720, the method may include measuring a received signal strength of each of a set of multiple resource elements of the set of multiple beams. The operations of 1720 may be performed in accordance with examples as disclosed herein. In some examples, aspects of the operations of 1720 may be performed by a reference signal measurement manager 1030 as described with reference to FIG. 10.

At 1725, the method may include summing the received signal strength measurements to generate a RSSI that is provided in the interference measurement report. The operations of 1725 may be performed in accordance with examples as disclosed herein. In some examples, aspects of the operations of 1725 may be performed by a reference signal measurement manager 1030 as described with reference to FIG. 10.

At 1730, the method may include identifying one or more interference levels of the one or more signals, where the one or more interference levels indicate channel occupation of an associated channel bandwidth of the one or more signals. The operations of 1730 may be performed in accordance with examples as disclosed herein. In some examples, aspects of the operations of 1730 may be performed by a reference signal measurement manager 1030 as described with reference to FIG. 10.

At 1735, the method may include transmitting, to the access network entity, the interference measurement report based on the one or more interference levels. The operations of 1735 may be performed in accordance with examples as disclosed herein. In some examples, aspects of the operations of 1735 may be performed by an interference measurement report manager 1035 as described with reference to FIG. 10.

Figure 18:
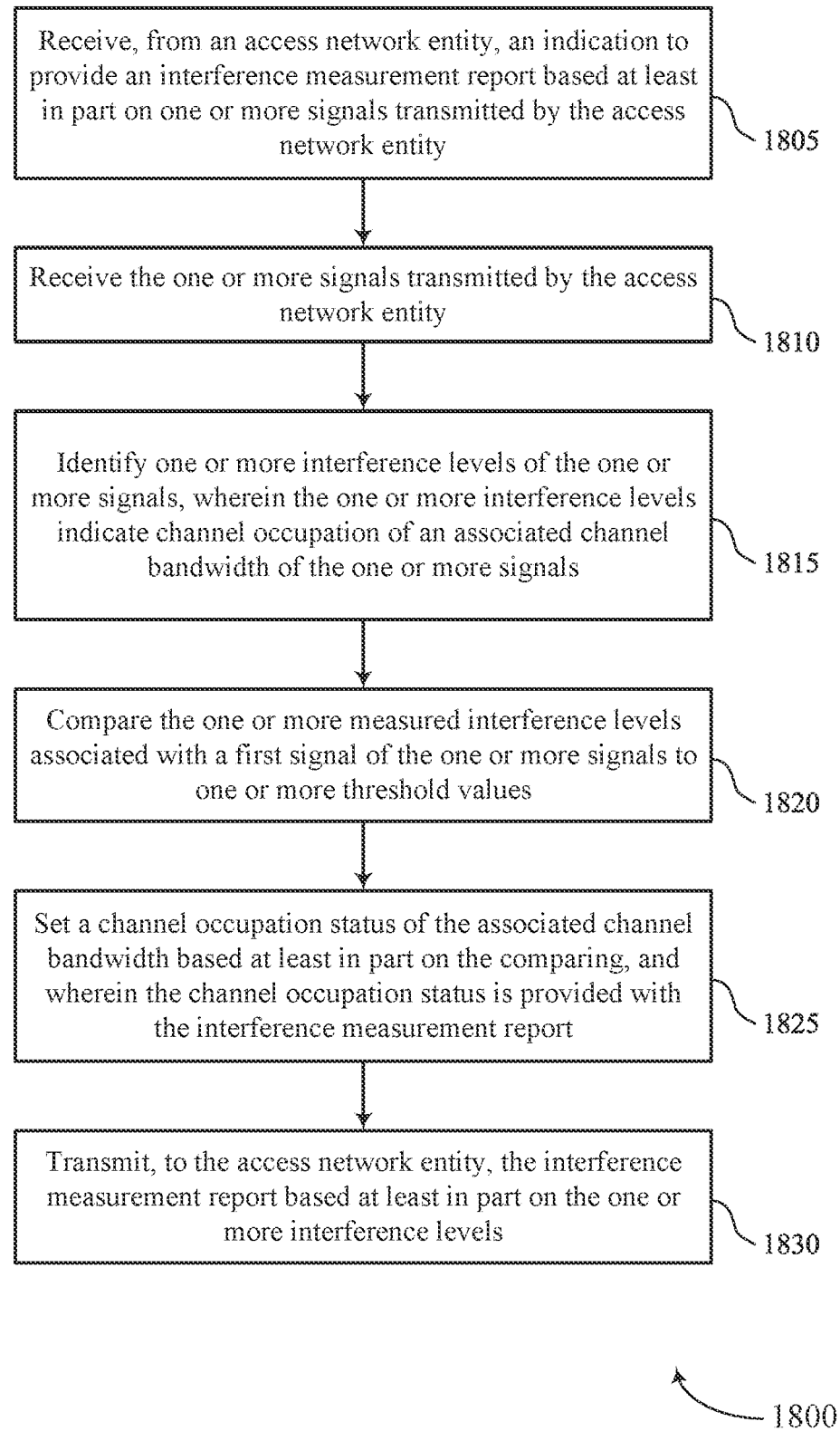

FIG. 18 shows a flowchart illustrating a method 1800 that supports techniques for interference measurement reporting for receiver-assisted channel access in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from an access network entity, an indication to provide an interference measurement report based on one or more signals transmitted by the access network entity. The operations of 1805 may be performed in accordance with examples as disclosed herein. In some examples, aspects of the operations of 1805 may be performed by a reference signal configuration manager 1025 as described with reference to FIG. 10.

At 1810, the method may include receiving the one or more signals transmitted by the access network entity. The operations of 1810 may be performed in accordance with examples as disclosed herein. In some examples, aspects of the operations of 1810 may be performed by a reference signal measurement manager 1030 as described with reference to FIG. 10.

At 1815, the method may include identifying one or more interference levels of the one or more signals, where the one or more interference levels indicate channel occupation of an associated channel bandwidth of the one or more signals. The operations of 1815 may be performed in accordance with examples as disclosed herein. In some examples, aspects of the operations of 1815 may be performed by a reference signal measurement manager 1030 as described with reference to FIG. 10.

At 1820, the method may include comparing the one or more measured interference levels associated with a first signal of the one or more signals to one or more threshold values. The operations of 1820 may be performed in accordance with examples as disclosed herein. In some examples, aspects of the operations of 1820 may be performed by a channel occupancy manager 1040 as described with reference to FIG. 10.

At 1825, the method may include setting a channel occupation status of the associated channel bandwidth based on the comparing, and where the channel occupation status is provided with the interference measurement report. The operations of 1825 may be performed in accordance with examples as disclosed herein. In some examples, aspects of the operations of 1825 may be performed by a channel occupancy manager 1040 as described with reference to FIG. 10.

At 1830, the method may include transmitting, to the access network entity, the interference measurement report based on the one or more interference levels. The operations of 1830 may be performed in accordance with examples as disclosed herein. In some examples, aspects of the operations of 1830 may be performed by an interference measurement report manager 1035 as described with reference to FIG. 10.

Figure 19:
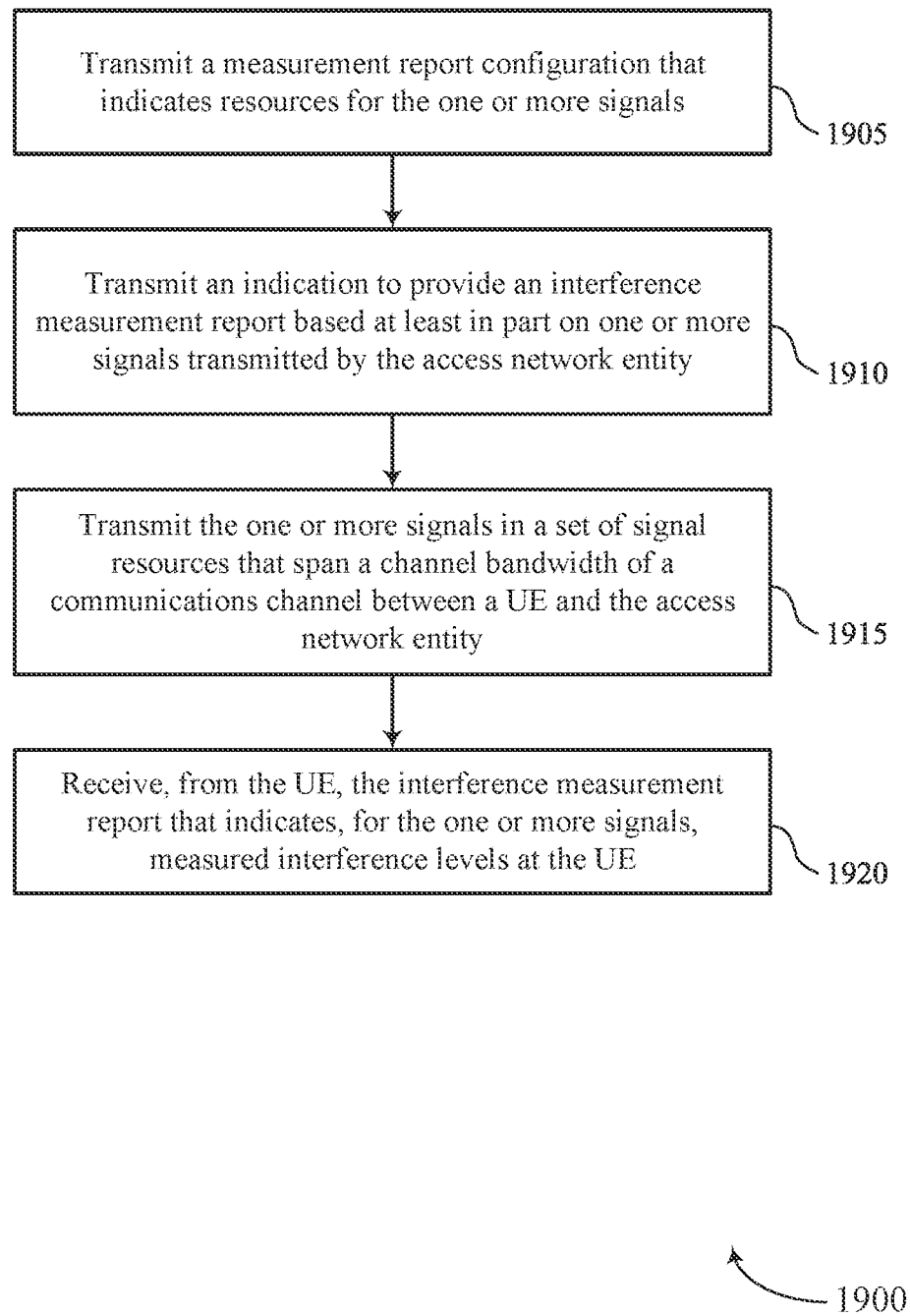

FIG. 19 shows a flowchart illustrating a method 1900 that supports techniques for interference measurement reporting for receiver-assisted channel access in accordance with aspects of the present disclosure. The operations of the method 1900 may be implemented by an access network entity such as a base station or its components as described herein. For example, the operations of the method 1900 may be performed by an access network entity or a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting a measurement report configuration that indicates resources for the one or more signals. The operations of 1905 may be performed in accordance with examples as disclosed herein. In some examples, aspects of the operations of 1905 may be performed by a reference signal configuration manager 1425 as described with reference to FIG. 14.

At 1910, the method may include transmitting an indication to provide an interference measurement report based on one or more signals transmitted by the access network entity. The operations of 1910 may be performed in accordance with examples as disclosed herein. In some examples, aspects of the operations of 1910 may be performed by a reference signal configuration manager 1425 as described with reference to FIG. 14.

At 1915, the method may include transmitting the one or more signals in a set of signal resources that span a channel bandwidth of a communications channel between a UE and the access network entity. The operations of 1915 may be performed in accordance with examples as disclosed herein. In some examples, aspects of the operations of 1915 may be performed by a reference signal transmission manager 1430 as described with reference to FIG. 14.

At 1920, the method may include receiving, from the UE, the interference measurement report that indicates, for the one or more reference signals, measured interference levels at the UE. The operations of 1920 may be performed in accordance with examples as disclosed herein. In some examples, aspects of the operations of 1920 may be performed by an interference measurement report manager 1435 as described with reference to FIG. 14.

Figure 20:
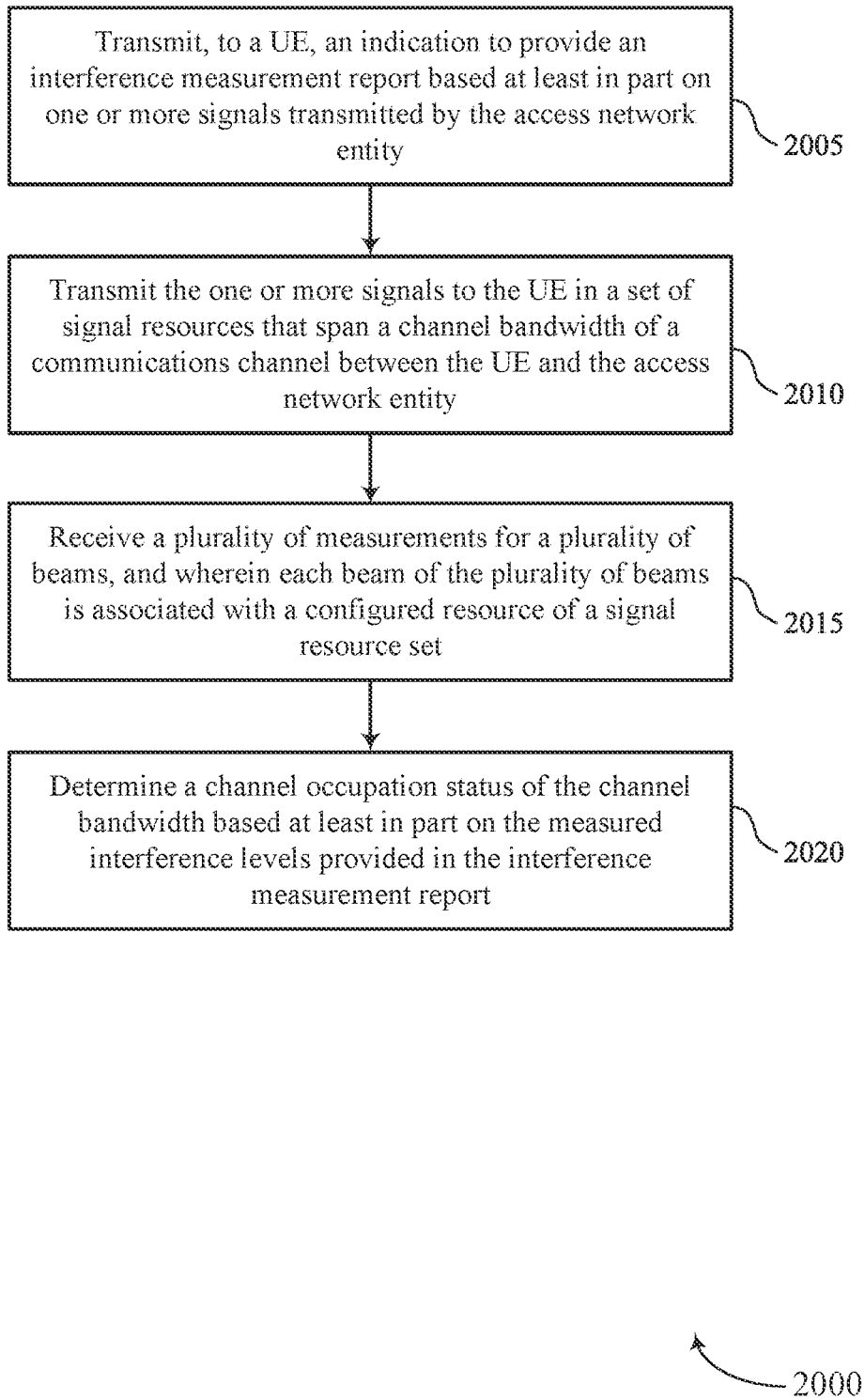

FIG. 20 shows a flowchart illustrating a method 2000 that supports techniques for interference measurement reporting for receiver-assisted channel access in accordance with aspects of the present disclosure. The operations of the method 2000 may be implemented by an access network entity or a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting an indication to provide an interference measurement report based on one or more signals transmitted by the access network entity. The operations of 2005 may be performed in accordance with examples as disclosed herein. In some examples, aspects of the operations of 2005 may be performed by a reference signal configuration manager 1425 as described with reference to FIG. 14.

At 2010, the method may include transmitting the one or more signals in a set of signal resources that span a channel bandwidth of a communications channel between a UE and the access network entity. The operations of 2010 may be performed in accordance with examples as disclosed herein. In some examples, aspects of the operations of 2010 may be performed by a reference signal transmission manager 1430 as described with reference to FIG. 14.

At 2015, the method may include receiving a set of multiple measurements for a set of multiple beams, and where each beam of the set of multiple beams is associated with a configured resource of a signal resource set. The operations of 2015 may be performed in accordance with examples as disclosed herein. In some examples, aspects of the operations of 2015 may be performed by a beam manager 1440 as described with reference to FIG. 14.

At 2020, the method may include determining a channel occupation status of the channel bandwidth based on the measured interference levels provided in the interference measurement report. The operations of 2020 may be performed in accordance with examples as disclosed herein. In some examples, aspects of the operations of 2020 may be performed by a channel occupancy manager 1445 as described with reference to FIG. 14.

The following provides an overview of aspects of the present disclosure:

Aspect 1: A method for wireless communication at a UE, comprising: receiving, from an access network entity, an indication to provide an interference measurement report based at least in part on one or more signals transmitted by the access network entity; receiving the one or more signals transmitted by the access network entity; and transmitting, to the access network entity, the interference measurement report based at least in part on the one or more interference levels of the one or more received signals, where the one or more interference levels indicate channel occupation of an associated channel bandwidth of the one or more signals.

Aspect 2: The method of aspect 1, wherein the one or more interference levels provide a wideband interference measurement across a channel bandwidth of a communications channel between the UE and the access network entity.

Aspect 3: The method of aspect 2, wherein the wideband interference measurement across the channel bandwidth of the communications channel indicates channel occupation for a receiver-assisted channel access procedure.

Aspect 4: The method of any of aspects 1 through 3, wherein the identifying further comprises: measuring a received signal strength of each of a plurality of resource elements of the one or more signals; and summing the received signal strength measurements to generate a received signal strength indicator (RSSI) that is provided in the interference measurement report.

Aspect 5: The method of aspect 4, wherein the measuring further comprises: measuring the one or more signals for a plurality of beams based at least in part on a plurality of transmission configuration indicator (TCI) states that are provided in a configuration for the interference measurement report.

Aspect 6: The method of any of aspects 4 through 5, wherein the interference measurement report provides layer one (L1) RSSI measurements over the one or more signals.

Aspect 7: The method of any of aspects 1 through 6, wherein the transmitting the interference measurement report comprises: reporting a plurality of measurements for a plurality of beams, wherein each beam of the plurality of beams is associated with a configured resource of a reference signal resource set.

Aspect 8: The method of any of aspects 1 through 7, further comprising: comparing the one or more measured interference levels associated with a first signal of the one or more signals to one or more threshold values; and setting a channel occupation status of the associated channel bandwidth based at least in part on the comparing, and wherein the channel occupation status is provided with the interference measurement report.

Aspect 9: The method of aspect 8, wherein the channel occupation status is a multi-level occupation status that is determined based at least in part on multiple threshold values that are compared to the one or more measured interference levels associated with the first signal.

Aspect 10: The method of aspect 9, wherein the multiple threshold values are configured by RRC signaling, in an activation DCI, or any combinations thereof.

Aspect 11: The method of any of aspects 1 through 10, further comprising: receiving, from the access network entity, a measurement report configuration that indicates resources for the one or more signals.

Aspect 12: The method of aspect 11, wherein the resources for the one or more signals include channel state information reference signal (CSI-RS) resources for interference measurement (CSI-IM) or non-zero-power CSI-IM.

Aspect 13: The method of any of aspects 11 through 12, wherein the measurement report configuration further indicates beam information for one or more beams associated with one or more signals.

Aspect 14: The method of aspect 13, wherein the beam information is included in the measurement report configuration in a beam indication field for one or more types of signals.

Aspect 15: The method of any of aspects 13 through 14, wherein the beam information is derived based at least in part on a signal spatial quasi-colocation (QCL), or QCL Type D, for one or more interference measurement resources.

Aspect 16: The method of aspect 15, wherein the beam information is provided in one or more explicit QCL information fields, or is derived from a beam associated with one or more synchronization signals, reference signals, beam selection signals, or control signals.

Aspect 17: The method of any of aspects 1 through 16, wherein the one or more signals are each transmitted in a plurality of resource elements that span the associated channel bandwidth of the associated signal.

Aspect 18: The method of any of aspects 1 through 17, wherein the one or more signals provide for time domain multiplexed interference measurements prior to performing a fast Fourier transform (FFT) on signal resources.

Aspect 19: The method of any of aspects 1 through 18, wherein the one or more signals span time resources associated with an LBT procedure associated with the receiver-assisted channel access procedure.

Aspect 20: The method of aspect 19, wherein each signal of the one or more signals are configured with a number of repetitions at symbol-level granularity and an offset relative to a starting symbol to provide resources that span the time resources associated with the LBT procedure.

Aspect 21: The method of any of aspects 19 through 20, wherein each signal of the one or more signals are configured in plurality of resource sets associated with a plurality of symbols that span the time resources associated with the LBT procedure.

Aspect 22: A method for wireless communication at an access network entity, comprising: transmitting an indication to provide an interference measurement report based at least in part on one or more signals transmitted by the access network entity; transmitting the one or more signals in a set of signal resources that span a channel bandwidth of a communications channel between a UE and the access network entity, and receiving, from the UE, the interference measurement report that indicates, for the one or more signals, measured interference levels at the UE.

Aspect 23: The method of aspect 22, wherein the measured interference levels provide a wideband interference measurement across a channel bandwidth of the communications channel between the UE and the access network entity.

Aspect 24: The method of aspect 23, wherein the wideband interference measurement across the channel bandwidth of the communications channel indicates channel occupation for a receiver-assisted channel access procedure.

Aspect 25: The method of any of aspects 22 through 24, wherein the interference measurement report indicates a received signal strength indicator (RSSI) for the one or more signals for the associated channel bandwidth.

Aspect 26: The method of aspect 25, further comprising: configuring the UE with a plurality of transmission configuration indicator (TCI) states for a plurality of beams, and wherein the indication to provide the interference measurement report indicates one or more of the TC states.

Aspect 27: The method of any of aspects 25 through 26, wherein the interference measurement report provides layer one (L1) RSSI measurements over the one or more signals.

Aspect 28: The method of any of aspects 22 through 27, wherein the receiving the interference measurement report comprises: receiving a plurality of measurements for a plurality of beams, and wherein each beam of the plurality of beams is associated with a configured resource of a signal resource set.

Aspect 29: The method of any of aspects 22 through 28, further comprising: determining a channel occupation status of the channel bandwidth based at least in part on the measured interference levels provided in the interference measurement report.

Aspect 30: The method of aspect 29, wherein the channel occupation status is a multi-level occupation status that is indicated by the interference measurement report based at least in part on multiple threshold values that are compared to the measured interference levels.

Aspect 31: The method of aspect 30, wherein the multiple threshold values are configured by RRC signaling, in an activation DCI, or any combinations thereof.

Aspect 32: The method of any of aspects 22 through 31, further comprising: transmitting a measurement report configuration that indicates resources for the one or more signals.

Aspect 33: The method of aspect 32, wherein the resources for the one or more signals include channel state information reference signal (CSI-RS) resources for interference measurement (CSI-IM) or non-zero-power CSI-IM.

Aspect 34: The method of any of aspects 32 through 33, wherein the measurement report configuration further indicates beam information for one or more beams associated with one or more signals.

Aspect 35: The method of aspect 34, wherein the beam information is included in the measurement report configuration in a beam indication field for one or more types of signals.

Aspect 36: The method of any of aspects 34 through 35, wherein the beam information is derived based at least in part on a reference signal spatial quasi-colocation (QCL), or QCL Type D, for one or more interference measurement resources.

Aspect 37: The method of any of aspects 22 through 36, wherein the one or more signals are each transmitted in a plurality of resource elements that span the channel bandwidth of the associated signal.

Aspect 38: The method of any of aspects 22 through 37, wherein the one or more signals provide for time domain multiplexed interference measurements prior to performing a fast Fourier transform (FFT) on signal resources.

Aspect 39: The method of any of aspects 22 through 38, wherein the one or more signals span time resources associated with an LBT procedure associated with the receiver-assisted channel access procedure.

Aspect 40: The method of aspect 39, wherein each signal of the one or more signals are configured with a number of repetitions at symbol-level granularity and an offset relative to a starting symbol to provide resources that span the time resources associated with the LBT procedure.

Aspect 41: The method of any of aspects 39 through 40, wherein each signal of the one or more signals are configured in plurality of resource sets associated with a plurality of symbols that span the time resources associated with the LBT procedure.

Aspect 42: An apparatus for wireless communication at a UE, comprising a processor; memory coupled with the processor: and instructions stored in the memory and executable by the processor to cause the apparatus to perform a method of any of aspects 1 through 21.

Aspect 43: An apparatus for wireless communication at a UE, comprising at least one means for performing a method of any of aspects 1 through 21.

Aspect 44: A non-transitory computer-readable medium storing code for wireless communication at a UE, the code comprising instructions executable by a processor to perform a method of any of aspects 1 through 21.

Aspect 45: An apparatus for wireless communication at an access network entity, comprising a processor: memory coupled with the processor: and instructions stored in the memory and executable by the processor to cause the apparatus to perform a method of any of aspects 22 through 41.

Aspect 46: An apparatus for wireless communication at an access network entity, comprising at least one means for performing a method of any of aspects 22 through 41.

Aspect 47: A non-transitory computer-readable medium storing code for wireless communication at an access network entity, the code comprising instructions executable by a processor to perform a method of any of aspects 22 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore. "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from an access network entity, an indication to provide an interference measurement report based at least in part on one or more signals configured for multiple beams for contention-based receiver-assisted channel access, wherein the contention-based receiver-assisted channel access indicates a channel availability or a channel occupation of an associated channel bandwidth of the one or more signals;
   receiving the one or more signals transmitted by the access network entity via the one or more beams as part of the contention-based receiver-assisted channel access; and
   transmitting, to the access network entity, the interference measurement report based at least in part on one or more interference levels of the one or more received signals, the one or more interference levels associated with a wideband interference measurement for the contention-based channel access across a channel bandwidth of a communications channel between the UE and the access network entity, wherein the one or more interference levels indicate the channel availability or the channel occupation of the associated channel bandwidth of the one or more signals.

2. The method of claim 1, wherein the one or more interference levels are measured from one or more reference signals transmitted by the access network entity.

3. The method of claim 1, wherein the wideband interference measurement across the channel bandwidth of the communications channel indicates channel occupation for the contention-based receiver-assisted channel access.

4. The method of claim 1, further comprising:
   measuring a received signal strength of each of a plurality of resource elements of the one or more signals; and
   summing the received signal strength measurements to generate a received signal strength indicator (RSSI) that is provided in the interference measurement report.

5. The method of claim 4, wherein the measuring further comprises:
   measuring the one or more signals for a plurality of beams based at least in part on a plurality of transmission configuration indicator (TCI) states that are provided by the network access entity.

6. The method of claim 1, wherein the transmitting the interference measurement report comprises:
   reporting a plurality of measurements for a plurality of beams, wherein each beam of the plurality of beams is associated with a configured resource of a signal resource set.

7. The method of claim 1, further comprising:
   comparing the one or more measured interference levels associated with a first signal of the one or more signals to one or more threshold values; and
   setting a channel occupation status of the associated channel bandwidth based at least in part on the comparing, and wherein the channel occupation status is provided with the interference measurement report.

8. The method of claim 7, wherein two or more threshold values are configured by radio resource control (RRC) signaling, in an activation downlink control information (DCI), or any combinations thereof.

9. The method of claim 1, further comprising:
   receiving, from the access network entity, a measurement report configuration that indicates resources for the one or more signals.

10. The method of claim 9, wherein the resources for the one or more signals include resources for interference measurements over reference signals that have zero power.

11. The method of claim 9, wherein the measurement report configuration further indicates beam information for the one or more beams.

12. The method of claim 11, wherein the beam information is included in the measurement report configuration in a beam indication field for one or more types of reference signals.

13. The method of claim 11, wherein the beam information is derived based at least in part on a reference signal spatial quasi-colocation (QCL), or QCL Type D, for one or more interference measurement resources.

14. The method of claim 11, wherein the beam information is provided in one or more explicit information fields, or is derived from a beam associated with one or more synchronization signals, reference signals, beam selection signals, or control signals.

15. The method of claim 1, wherein the one or more signals are each transmitted in a plurality of resource elements that span the associated channel bandwidth of the associated signal.

16. The method of claim 1, wherein the one or more signals provide for time domain multiplexed interference measurements prior to performing a fast Fourier transform (FFT) on signal resources.

17. The method of claim 1, wherein the one or more signals span time resources associated with a listen-before-talk (LBT) procedure associated with the contention-based receiver-assisted channel access.

18. The method of claim 17, wherein each signal of the one or more signals is configured with a number of repetitions at symbol-level granularity and an offset relative to a starting symbol to provide resources that span time resources associated with the LBT procedure.

19. The method of claim 17, wherein each signal of the one or more signals are configured in plurality of resource sets associated with a plurality of symbols that span time resources associated with the LBT procedure.

20. A method for wireless communication at an access network entity, comprising:
  transmitting, to a user equipment (UE), an indication to provide an interference measurement report based at least in part on one or more signals configured for multiple beams for contention-based receiver-assisted channel access, wherein the contention-based receiver-assisted channel access indicates a channel availability or a channel occupation of an associated channel bandwidth of the one or more signals;
  transmitting, via the one or more beams and as part of the contention-based receiver-assisted channel access, the one or more signals to the UE in a set of resources that span a channel bandwidth of a communications channel between the UE and the access network entity; and
  receiving, from the UE, the interference measurement report that indicates, for the one or more signals, measured interference levels at the UE, the measured interference levels associated with a wideband interference measurement for the contention-based channel access across a channel bandwidth of the communications channel, wherein the measured interference levels indicate the channel availability or the channel occupation of the associated channel bandwidth of the one or more signals.

21. The method of claim 20, wherein the wideband interference measurement across the channel bandwidth of the communications channel indicates channel occupation for the contention-based receiver-assisted channel access.

22. The method of claim 20, wherein the interference measurement report indicates a received signal strength indicator (RSSI) for the one or more signals for the associated channel bandwidth.

23. The method of claim 22, further comprising:
  configuring the UE with a plurality of transmission configuration indicator (TCI) states for a plurality of beams, and wherein the indication to provide the interference measurement report indicates one or more of the plurality of TCI states.

24. An apparatus for wireless communication at a user equipment (UE), comprising:
  a processor;
  memory coupled with the processor, and instructions stored in the memory and executable by the processor to cause the apparatus to:
    receive, from an access network entity, an indication to provide an interference measurement report based at least in part on one or more signals configured for multiple beams for contention-based receiver-assisted channel access, wherein the contention-based receiver-assisted channel access indicates a channel availability or a channel occupation of an associated channel bandwidth of the one or more signals;
    receive the one or more signals transmitted by the access network entity via the one or more beams as part of the contention-based receiver-assisted channel access;
    identify one or more interference levels of the one or more signals, wherein the one or more interference levels indicate channel occupation of an associated channel bandwidth of the one or more signals; and
    transmit, to the access network entity, the interference measurement report based at least in part on one or more interference levels of the one or more received signals, the one or more interference levels associated with a wideband interference measurement for the contention-based channel access across a channel bandwidth of a communications channel between the UE and the access network entity, wherein the one or more interference levels indicate the channel availability or the channel occupation of the associated channel bandwidth of the one or more signals.

25. The apparatus of claim 24, wherein the wideband interference measurement across the channel bandwidth of the communications channel indicates channel occupation for the contention-based receiver-assisted channel access.

26. The apparatus of claim 24, wherein the one or more interference levels are measured from one or more reference signals transmitted by the access network entity.

27. The apparatus of claim 24, wherein the instructions are executable by the processor to further cause the apparatus to:
  measure a received signal strength of each of a plurality of resource elements of the one or more signals; and
  sum the received signal strength measurements to generate a received signal strength indicator (RSSI) that is provided in the interference measurement report.

28. The apparatus of claim 27, wherein, to measure the received signal strength, the instructions are executable by the processor to further cause the apparatus to:
  measure the one or more signals for a plurality of beams based at least in part on a plurality of transmission configuration indicator (TCI) states that are provided by the network access entity.

29. The apparatus of claim 24, wherein, to transmit the interference measurement report, the instructions are executable by the processor to further cause the apparatus to:
  report a plurality of measurements for a plurality of beams, wherein each beam of the plurality of beams is associated with a configured resource of a signal resource set.

30. An apparatus for wireless communication at an access network entity, comprising:
  a processor;
  memory coupled with the processor; and
  instructions stored in the memory and executable by the processor to cause the apparatus to:
    transmit, to a user equipment (UE), an indication to provide an interference measurement report based at least in part on one or more signals configured for multiple beams for contention-based receiver-assisted channel access, wherein the contention-based receiver-assisted channel access indicates a channel availability or a channel occupation of an associated channel bandwidth of the one or more signals;
    transmit, via the one or more beams and as part of the contention-based receiver-assisted channel access, the one or more signals to the UE in a set of resources that span a channel bandwidth of a communications channel between the UE and the access network entity; and
    receive, from the UE, the interference measurement report that indicates, for the one or more signals, measured interference levels at the UE, the measured interference levels associated with a wideband interference measurement for the contention-based channel access across a channel bandwidth of the communications channel, wherein the measured interference levels indicate the channel availability or the channel occupation of the associated channel bandwidth of the one or more signals.

\* \* \* \* \*